(12) United States Patent
Kaizer et al.

(10) Patent No.: US 11,924,161 B1
(45) Date of Patent: Mar. 5, 2024

(54) AUTHORIZATION AND REFUSAL OF MODIFICATION, AND PARTIAL MODIFICATION ABILITY, OF A NETWORK IDENTIFIER

(71) Applicant: VERISIGN, INC., Reston, VA (US)

(72) Inventors: Andrew Kaizer, Arlington, VA (US); Swapneel Sheth, Fairfax, VA (US)

(73) Assignee: VERISIGN, INC., Reston, VA (US)

( * ) Notice: Subject to any disclaimer, the term of this patent is extended or adjusted under 35 U.S.C. 154(b) by 299 days.

(21) Appl. No.: 17/325,949

(22) Filed: May 20, 2021

(51) Int. Cl.
*H04L 61/4511* (2022.01)
*H04L 9/40* (2022.01)
*H04L 101/618* (2022.01)

(52) U.S. Cl.
CPC .......... *H04L 61/4511* (2022.05); *H04L 63/10* (2013.01); *H04L 2101/618* (2022.05)

(58) Field of Classification Search
None
See application file for complete search history.

(56) References Cited

U.S. PATENT DOCUMENTS

| | | | |
|---|---|---|---|
| 10,721,060 | B1 | 7/2020 | Kaizer et al. |
| 11,159,326 | B1 | 10/2021 | Nelson et al. |
| 11,354,658 | B2 | 6/2022 | Lyons et al. |
| 11,392,579 | B2 | 7/2022 | Kasimov et al. |
| 11,587,071 | B2 | 2/2023 | Ravinathan et al. |
| 11,621,829 | B2 | 4/2023 | Kaizer et al. |
| 11,632,236 | B1 | 4/2023 | Kaizer et al. |
| 2005/0204064 | A1* | 9/2005 | Ruiz ................... H04L 61/4511 709/245 |

(Continued)

FOREIGN PATENT DOCUMENTS

| | | |
|---|---|---|
| CN | 107705114 A | 2/2018 |
| CN | 109981633 A | 7/2019 |

(Continued)

OTHER PUBLICATIONS

International Search Report and Written Opinion issued in International Application No. PCT/US2019/038447 dated Sep. 30, 2019, pp. 1-15.

(Continued)

*Primary Examiner* — Kaveh Abrishamkar
(74) *Attorney, Agent, or Firm* — Lee & Hayes P.C.

(57) ABSTRACT

Systems, methods, and computer products for providing fractional control of a domain name by a plurality of entities enable operations that may include: providing an executable program for storage on a blockchain, the executable program configured to store a representation of the domain name in association with a plurality of identifications that each correspond to an entity that has a fractional control of the domain name; indicating, to the program, that the domain name is available for fractional control; receiving a message that includes the representation of the domain name and indications of a plurality of blockchain addresses, which are stored by the program as the plurality of identifications; and storing, in a domain name registration database, a representation of a fractional control status of the domain name. Each fractional control of the domain name may enable an authorization or a refusal of a modification related to the domain name.

20 Claims, 10 Drawing Sheets

(56) References Cited

U.S. PATENT DOCUMENTS

| | | | |
|---|---|---|---|
| 2005/0216567 A1* | 9/2005 | Ruiz | H04L 51/48 709/206 |
| 2007/0130316 A1 | 6/2007 | Turakhia | |
| 2007/0143469 A1 | 6/2007 | Adams et al. | |
| 2008/0235383 A1 | 9/2008 | Schneider | |
| 2011/0296440 A1 | 12/2011 | Laurich et al. | |
| 2012/0011360 A1 | 1/2012 | Engels et al. | |
| 2012/0174198 A1 | 7/2012 | Gould et al. | |
| 2015/0278820 A1 | 10/2015 | Meadows | |
| 2016/0173439 A1 | 6/2016 | Kaliski, Jr. et al. | |
| 2016/0182490 A1* | 6/2016 | Gupta | H04L 63/0823 713/171 |
| 2016/0196300 A1 | 7/2016 | Kamdar et al. | |
| 2016/0292672 A1 | 10/2016 | Fay et al. | |
| 2017/0046689 A1* | 2/2017 | Lohe | G06Q 20/065 |
| 2017/0180134 A1 | 6/2017 | King | |
| 2017/0310484 A1 | 10/2017 | Kaliski, Jr. et al. | |
| 2017/0324738 A1 | 11/2017 | Hari et al. | |
| 2017/0330174 A1 | 11/2017 | Demarinis et al. | |
| 2017/0344988 A1 | 11/2017 | Cusden et al. | |
| 2017/0346833 A1 | 11/2017 | Zhang | |
| 2018/0227275 A1 | 8/2018 | Russinovich et al. | |
| 2018/0262493 A1 | 9/2018 | Andrade | |
| 2018/0276663 A1 | 9/2018 | Arora | |
| 2018/0287997 A1 | 10/2018 | Li et al. | |
| 2019/0121988 A1 | 4/2019 | van de Ruit et al. | |
| 2019/0156040 A1 | 5/2019 | Sasin et al. | |
| 2019/0166085 A1 | 5/2019 | Li et al. | |
| 2019/0220831 A1 | 7/2019 | Rangarajan | |
| 2019/0236571 A1 | 8/2019 | Arora et al. | |
| 2019/0253252 A1 | 8/2019 | Qiu | |
| 2019/0333054 A1 | 10/2019 | Cona et al. | |
| 2020/0021446 A1 | 1/2020 | Roennow et al. | |
| 2020/0058023 A1 | 2/2020 | Travizano et al. | |
| 2020/0145373 A1 | 5/2020 | Richardson | |
| 2020/0314055 A1 | 10/2020 | Blinn | |
| 2020/0328883 A1 | 10/2020 | Kaizer et al. | |
| 2020/0382372 A1 | 12/2020 | Easwar Prasad et al. | |
| 2020/0403809 A1 | 12/2020 | Chan et al. | |
| 2021/0037013 A1 | 2/2021 | Salkintzis | |
| 2021/0135867 A1 | 5/2021 | Zeng et al. | |
| 2021/0256622 A1* | 8/2021 | Hartley | G06F 8/61 |
| 2021/0385268 A1* | 12/2021 | Cirillo | G06F 9/5072 |
| 2022/0103370 A1 | 3/2022 | Alwen et al. | |
| 2022/0173894 A1* | 6/2022 | Cain, Jr. | H04L 9/14 |
| 2022/0376889 A1 | 11/2022 | Kaizer et al. | |
| 2022/0376925 A1 | 11/2022 | Kaizer et al. | |

FOREIGN PATENT DOCUMENTS

| | | |
|---|---|---|
| CN | 112671950 A | 4/2021 |
| CN | 112765684 A | 5/2021 |
| JP | 2021-524978 A | 9/2021 |
| WO | 2018007828 A2 | 1/2018 |
| WO | 2020/150741 A1 | 7/2020 |
| WO | 2022/246189 A1 | 11/2022 |
| WO | 2022/246193 A1 | 11/2022 |

OTHER PUBLICATIONS

Domraider, "ICO Whitepaper," www.domraider.io, SIRET 79417114000013 [retrieved on Aug. 25, 2019]. Retrieved from the Internet: URL:https://s3-eu-west-1.amazonaws.com/domraider/domraider/DomRaider+ICO+Whitepaper+EN.pdf pp. 1-127.

Johnson, N., "How to claim your DNS domain on ENS," The Ethereum Name Service, Nov. 11, 2017, https://medium.com/the-ethereum-name-service/how-to-claim-your-dns-domain-on-ens-e600ef2d92ca, accessed Jun. 29, 2018, pp. 1-4.

Moosavi, "Rethinking Certificate Authorities: Understanding and Decentralizing Domain Validation," Concordia Institute for Information Systems Engineering, Montreal, Quebec, Canada, Apr. 2, 2018, [retrieved on Aug. 25, 2019]. Retrieved from the Internet: URL:https://pdfs.semanticscholar.org/7e38/b0c0e6f7066de9821b8fab6a489a 79907 44f.pdf pp. 1-92.

Tarasov, P. "Internet Voting Using Zcash," University of Dublin, Trinity College, May 2017 [retrieved on Aug. 25, 2019]. Retrieved from the Internet: URL:https://scss.tcd .ie/publications/theses/diss/20 17/TCD-SCSS-DISSERTA TION-2017-015.pdf pp. 1-89.

International Preliminary Report on Patentability issued in International Application No. PCT/US2019/038447 dated Jan. 7, 2021, pp. 1-13.

Notice of Allowance issued in U.S. Appl. No. 16/024,488 dated Mar. 13, 2020, 30 pages.

Office Action issued in U.S. Appl. No. 16/402,047 dated Feb. 1, 2021, 14 pages.

Office Action issued in U.S. Appl. No. 16/402,047 dated May 11, 2021, 9 pages.

Office Action issued in U.S. Appl. No. 16/515,825 dated Apr. 15, 2021, 14 bages.

Office Action issued in U.S. Appl. No. 16/402,047 dated Aug. 9, 2021, 10 pages.

Office Action issued in U.S. Appl. No. 16/515,825 dated Sep. 20, 2021, 19 pages.

Baritz et al., ID4me—Technical White Paper Draft, Version 14, Feb. 28, 2020, 39 pages.

Bertola, V., ID4me, Technical overview, Version 1.4, Oct. 4, 2019, 16 pages.

Bertola, V., ID4me, General Overview, Version 1.3, Oct. 6, 2019, 5 pages.

Dan.com, "Domain Industry, Let us Innovate.", Retrieved from the Internet: https://blog.undeveloped.com/domain-industry-join-us-in-becoming-innovative-thriving-again-a751d2e17ae9, Nov. 21, 2017 [retrieved on Sep. 17, 2021], pp. 1-6.

DNS Registrar guide—Ethereum Name Service, Retrieved from the Internet on Sep. 22, 2021: https://docs.ens.domains/dns-registrar-guide, pp. 1-5.

Einarrson, B., "[DNSOP] Verifying TLD operator authorisation," Retrieved from the Internet: https://mailarchive.ietf.org/arch/msg/dnsop/qaDjnArp98T0gIBYQbUfswwaxrg, Jun. 18, 2019 [retrieved on Sep. 17, 2021], 1 page.

Hollenbeck, S., "Extensible Provisioning Protocol (EPP) Domain Name Mapping," RFC 4931, Retrieved from the Internet: https://datatracker.ietf.org/doc/html/rfc4931, May 2007 [retrieved on Sep. 7, 2021], pp. 1-46.

Hollenbeck, S., "Extensible Provisioning Protocol (EPP)," RFC 5730, Retrieved from the Internet: https://datatracker.ietf.org/doc/html/rfc5730, Aug. 2009 [retrieved on Sep. 7, 2021], pp. 1-67.

Hollenbeck et al., "Security Services for the Registration Data Access Protocal (RDAP)," RFC 7481, Retrieved from the Internet: https://tools.ietf.org/html/rfc7481, Mar. 2015 [retrieved on Sep. 7, 2021], pp. 1-13.

Johnson, N., "[DNSOP] Verifying TLD operator authorisation," Retrieved from the Internet: https://mailarchive.ietf.org/arch/msg/dnsop/AX5D3cqSTWF69pAWqu5Pn6SGXDs, Jun. 14, 2019 [retrieved on Sep. 17, 2021], 1 page.

Johnson, N., "ENS Root Change Will Allow Easy Integration of More Than 1300 DNS TLDs," Retrieved from the Internet: https://medium.com/the-ethereum-name-service/upcoming-changes-to-the-ens-root-a1b78fd52b38, Feb. 25, 2019 [retrieved on Sep. 7, 2021], 4 pages.

Johnson, N., "Introducing .luxe on ENS," Retrieved from the Internet: https://medium.com/@weka/introducing-luxe-on-ens-35a9ee2383ce, Oct. 2, 2018 [retrieved on Sep. 7, 2021], 4 pages.

Kuhl, R., "[DNSOP] Verifying TLD operator authorisation," Retrieved from the Internet: https://mailarchive.ietf.org/arch/msg/dnsop/DQEjRQZAafeGoMckNTt5GxSTe9g, Jun. 14, 2019 [retrieved on Sep. 17, 2021], 1 page.

Millegan, B., "ENS + .KRED: Major Integration of DNS and ENS Launches," Retrieved from the Internet: https://medium.com/the-ethereum-name-service/ens-kred-major-integration-of-dns-and-ens-launches-e7efb4dd872a, Feb. 19, 2020 [retrieved on Sep. 7, 2021], 3 pages.

Millegan, B., "Ethereum Name Service," Retrieved from the Internet on Sep. 7, 2021: https://vir.isi.edu/events/dinr2020/S/blantly-ENS.pdf, 24 pages.

(56) References Cited

OTHER PUBLICATIONS

Millegan, B., "Linking DNS with blockchain-based ENS records," Retrieved from the Internet on Sep. 7, 2021: https://conso.icann.org/sites/default/files/field-attached/presentation-dns-blockchain-ens-24jun19-en.pdf, 31 pages.

Monster, R., "Domain Leasing : How we do it at Epik, and how you can too!," Retrieved from the Internet: https://www.epik.com/blog/leasing-domains-how-we-do-it-at-epik-and-how-you-can-too.html, Mar. 27, 2020 [retrieved on Sep. 7, 2021], 14 pages.

Verisign, Inc., "Ethereum Name Service (ENS) Root Change Issues," Verisign Technical Note, Retrieved from the Internet on Sep. 22, 2021: https://www.verisign.com/assets/labs/ens-root-change-issues-5.2020.pdf, pp. 1-2.

International Search Report and Written Opinion for Application No. PCT/US2022/030241, dated Oct. 6, 2022, 8 pages.

International Search Report and Written Opinion for Application No. PCT/US2022/030248, dated Oct. 6, 2022, 6 pages.

U.S. Notice of Allowance for U.S. Appl. No. 17/325,687, dated Apr. 17, 2023, 25 pages.

\* cited by examiner

AUTHORIZATION AND REFUSAL OF MODIFICATION, AND PARTIAL MODIFICATION ABILITY, OF A NETWORK IDENTIFIER

FIELD

This disclosure relates generally to using a blockchain to maintain information about a domain name, such as control and modification abilities of the domain name.

BACKGROUND

A network identifier infrastructure system may assign network identifiers to network resources present at network addresses. Network identifiers may include alphanumeric strings. For example, network identifiers may include human-readable names. Examples of network identifiers include internet domain names, social media handles, telephone numbers, email addresses, and digital object architecture handles. Network identifiers may be organized in a hierarchy, with top level network identifiers at the top, and any number of network identifiers below them in the hierarchy. The network resources to which such network identifiers are assigned by the network identifier infrastructure system may be any of a variety of network resources, such as network-connected computers, social media accounts, telephone connections, email servers, or digital object architecture objects. For example, the assignments may associate network identifiers with network addresses for the network resources. The network addresses may be in the form of numerical labels, for example, internet protocol (IP) addresses or blockchain addresses (described further below). Such numerical labels may be difficult for typical humans to remember. Thus, network infrastructure systems may, for example, assign human-friendly network identifiers to network resources present at network addresses that are inconvenient for humans to retain and utilize.

A particular type of network identifier infrastructure system is a domain name system (DNS). The term domain name system (DNS) may refer to, for example, a network identifier infrastructure system, such as a hierarchical distributed network identifier infrastructure system, for resources provided by computer servers that are connected to the internet. A DNS may associate a network identifier, such as domain name, to a network address, such as a numeric internet protocol (IP) address, of an internet resource. A DNS may thus allow computers to access networked resources, including webpages, using the assigned names.

In general, network infrastructure information (e.g., associations of network resources with network identifiers, public keys of asymmetric key pairs, signatures, etc.) may be stored in network infrastructure records. Further, network identifier infrastructure systems may include one or more authoritative record keepers. For example, a network identifier infrastructure system may include a network-accessible authoritative database that stores multiple network infrastructure records. Such an authoritative database may provide network infrastructure records to other, e.g., non-authoritative, network-accessible databases in the network. Some network identifier infrastructures are hierarchical, e.g., an authoritative record keeper may provide network infrastructure records to network-accessible databases that are under the authoritative record keeper in the hierarchy. Some such network identifier infrastructure systems may be structured such that an authoritative record keeper provides network infrastructure records to segments of the network. For example, such a network identifier infrastructure system may provide to a respective database for that segment a network segment file, which may include network infrastructure records for resources that are present in that particular network segment.

An authoritative record keeper in the context of a DNS may be referred to as a registry. A registry may include an authoritative, master database of domain names registered under a top-level domain, or other domain in which domain names can be registered. A registry may include many hardware computer servers operably coupled to the internet. For ease of discussion, a registry may be identified with its computer servers. Further, in the context of a DNS, network infrastructure records may be referred to as resource records, a network segment may be referred to as a zone, and a file of resource records for a particular zone may be referred to as a zone file.

Network identifier infrastructure systems may utilize registration facilitators to register network identifiers to entities referred to as registrants. For example, a registration facilitator may act as an intermediary between an authoritative record keeper and a person that wishes to register a network identifier. The registration facilitator may charge a fee to the registrant and convey registration information, e.g., the network identifier and a network address to which it is to be associated, to an authoritative record keeper. The authoritative record keeper may update its records accordingly. According to some networks, registrants are unable to directly interact with authoritative record keepers, and instead interact through registration facilitators.

In the context of a DNS, a registration facilitator may be referred to as a registrar. Registrars may facilitate registration of domain names to registrants in the DNS. Registrars may compete with one another to register domain names for registrants through the DNS registry. For example, an internet user may interact with a registrar to register a domain name, thereby becoming a registrant for the domain name. Registrars may include many hardware computer servers. For ease of discussion, a registrar may be identified with its hardware computer servers unless otherwise specified or clear from context. Further, for ease of discussion, a registrant may be identified with its hardware client computer unless otherwise specified or clear from context.

The term network identifier infrastructure operator may refer to an authoritative record keeper or a registration facilitator, for example. Similarly, the term DNS operator may refer to a registry or registrar, for example.

An electronic ledger that records transactions may be referred to as a blockchain. Such transactions may include, but are not limited to, cryptocurrency transactions. In general, a blockchain may be implemented as a decentralized distributed readable and writeable computer interpretable data structure, stored in various computers (e.g., nodes) in a blockchain network (e.g., a cryptocurrency network). A blockchain may be constructed from individual logical blocks. Each block may include any, or a combination, of: a timestamp representing a time of the block's creation, a cryptographic hash of an identification of the previous block, and a payload, which includes data that may represent transactions or other information. The data in the blockchain payload may represent, for example, for each of a plurality of transactions, a transaction identifier, a transaction amount, and the address associated with the receiving party (e.g., associated with the receiving party's public key).

Blockchain users may have an associated blockchain address and/or cryptographic key pair, e.g., an asymmetric cryptographic key pair. Such a key pair may be referred to as the user's blockchain key pair, consisting of a public key (e.g., usable by the user to receive cryptocurrency) and a private key (e.g., usable by the user to send cryptocurrency). Each blockchain user may have a blockchain address that may serve as the user's identifier for purposes of the blockchain. For example, the blockchain address may be derived from the public key of the user's blockchain key pair, e.g., by applying a hash function. A first blockchain user may receive cryptocurrency from a second blockchain user, for example, who utilizes a blockchain address of the first blockchain user.

SUMMARY

Various embodiments include systems, methods, and computer products and media for providing fractional control of a domain name, e.g., by a plurality of entities. In various implementations, the systems, methods, and computer products may perform, execute or enable operations, functions, and/or behaviors that include: providing an executable program for storage on a blockchain, the executable program configured to store a representation of the domain name in association with a plurality of identifications, wherein each of the plurality of identifications correspond to an entity that has a fractional control of the domain name, wherein each fractional control of the domain name allows for providing one of an authorization or a refusal of a modification related to the domain name; indicating, to the executable program, that the domain name is available for fractional control; receiving a message from the executable program, the message comprising the representation of the domain name and indications of a plurality of blockchain addresses, where the indications of the plurality of blockchain addresses are stored by the executable program as the plurality of identifications; and storing, in a domain name registration database, a representation of a fractional control status of the domain name.

In some embodiments, the fractional control status of the domain name comprises a fractional control locked status of the domain name.

In some embodiments, the operations further include: receiving a request to update domain name system data for the domain name for a geographic region, wherein the request originates from at least one entity represented by the indications of the plurality of blockchain addresses; determining that the at least one entity is authorized to update domain name system data for the domain name for the geographic region; and updating the domain name system data for the domain name for the geographic region.

In some embodiments, the executable program is further configured to determine whether to update domain name system data for the domain name by sending queries to a plurality of entities represented by the indications of the plurality of blockchain addresses; and the operations further include: receiving a request to update domain name system data for the domain name, wherein the request originates from an entity represented by one of the indications of the plurality of blockchain addresses; conveying a representation of the request to the executable program; receiving a response from the executable program; and updating the domain name system data for the domain name based on the response.

In various embodiments, the operations further include: prior to the storing, receiving a message from a registrar for the domain name requesting the indicating.

In other embodiments, the operations further include: receiving a request for a registration status for the domain name; and providing, in response to the message, at least one of the indications of the plurality of blockchain addresses.

In yet other embodiments, the operations further include: providing, to at least one entity represented by the indications of the plurality of blockchain addresses, an interface to the executable program. In some such embodiments, the interface is configured to retrieve, from the executable program, the domain name that is available for fractional control, and the interface is configured to display the domain name that is available for fractional control.

In some embodiments, the operations further include: receiving, from a requesting entity, a request to register the domain name; and conveying a representation of the request to the executable program.

In still other embodiments, the executable program is further configured to determine whether to authorize registration of the domain name by the requesting entity based on a plurality of communications received from entities represented by the indications of the plurality of blockchain addresses.

Various additional embodiments include systems, methods, and computer products and media for providing a partial modification ability of a domain name registered to another. In various implementations, these additional systems, methods, and computer products may perform, execute or enable operations, functions, and/or behaviors that include: providing an executable program for storage on a blockchain, the executable program configured to store a representation of the domain name in association with an entity identification and an identification of a registrant of the domain name, wherein the entity identification corresponds to an entity that has partial modification ability of the domain name, wherein the partial modification ability of the domain name comprises an ability to modify at least one domain name system record of the domain name, and wherein the partial modification ability does not comprise a transfer ability of the domain name; indicating, to the executable program, that the domain name is available for partial modification ability; receiving a message from the executable program, the message comprising a representation of the domain name and an indication of a blockchain address stored by the executable program as the entity identification; and storing, in a domain name registration database, a representation of a partial modification ability status of the domain name.

In some embodiments, the representation of the partial modification ability status of the domain name comprises a partial modification ability locked status of the domain name.

In some embodiments, the operations further include: storing in association with the domain name, in the registration database, a contact object for the entity. In some such embodiments the operations further still include: receiving a request for a registration status of the domain name; and providing a response to the message, wherein the response comprises the contact object for the entity.

In some embodiments, the operations further include: prior to the storing, receiving a message from a registrar for the domain name requesting the indicating.

In some embodiments, the operations further include: providing, to at least the entity, an interface to the executable program. In some such embodiments, the interface is configured to retrieve, from the executable program, the domain name that is available for partial modification ability, and the interface is configured to display the domain name that is available for partial modification ability.

In various embodiments, the executable program is further configured to store a representation of a term of validity for the partial modification ability of the domain name. In some such embodiments, the executable program is also configured to terminate the partial modification ability of the domain name after the term of validity, and the operations further include: receiving, after the term of validity, a message from the executable program, the message comprising the representation of the domain name and an indication that the entity no longer has partial modification ability of the domain name; and removing the partial modification ability status of the domain name in the registration database.

In some other such embodiments where the executable program is configured to store a representation of a term of validity for the partial modification ability of the domain name, the executable program is further configured to terminate the partial modification ability of the domain name after the term of validity, and the operations further include: receiving, after the term of validity, a message from the executable program, wherein the message comprises the representation of the domain name and a request to register the domain name to the entity; removing the partial modification ability status of the domain name in the registration database; and registering the domain name to the entity.

In various system implementations of any of the foregoing embodiments, the system may include: a memory containing instructions; and a processor, operably connected to the memory, that executes the instructions to perform, execute, or enable the operations, functions, and/or behaviors described herein.

It is intended that combinations of the above-described elements and those within the specification may be made, except where otherwise contradictory.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
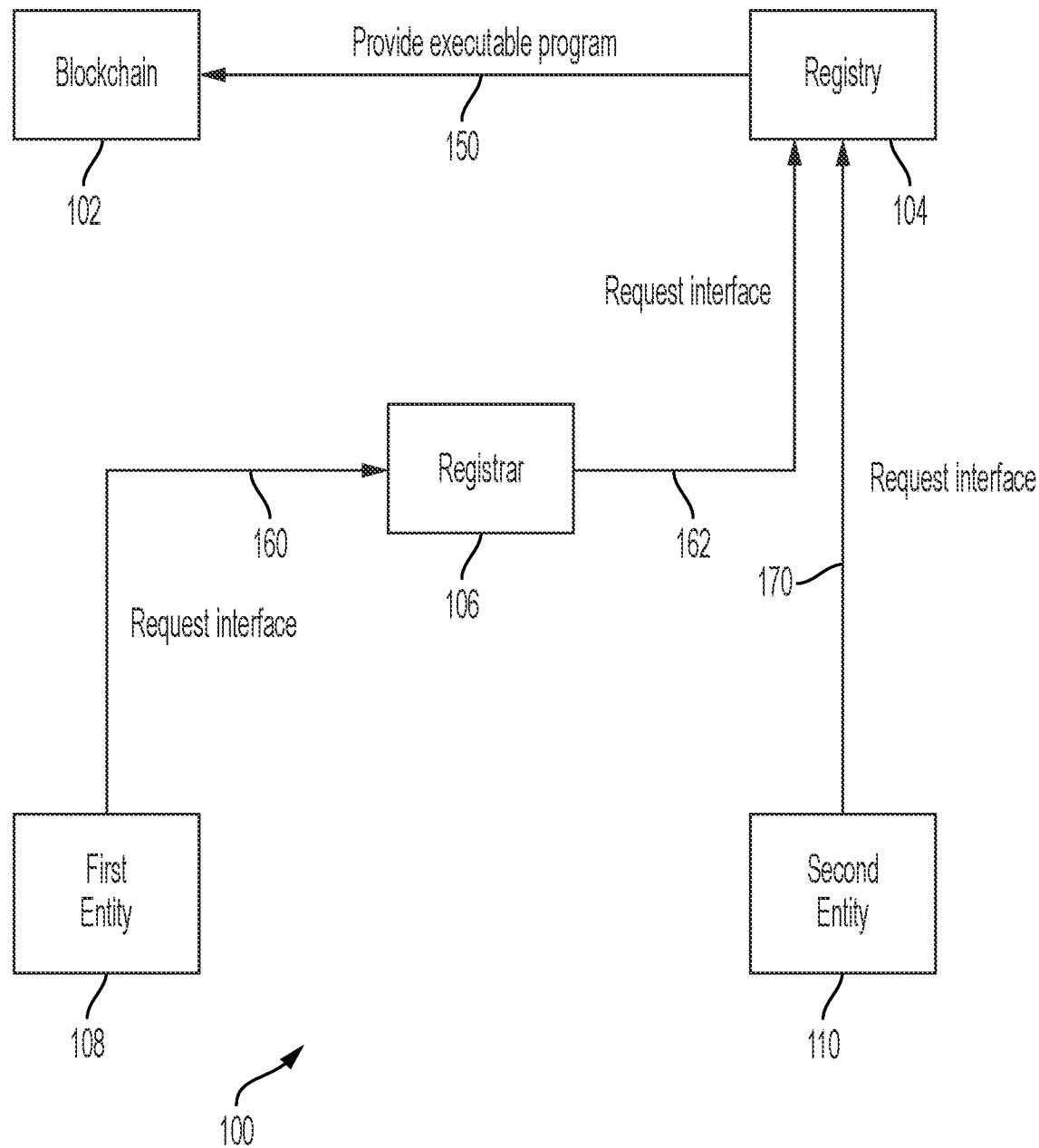
FIG. 1 is a schematic diagram for a method of preparing a blockchain and providing user accounts to a plurality of entities to establish fractional control of a domain name according to various embodiments.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

I. Fractional Control

Some embodiments according to Section I provide fractional control of a domain name through the use of a blockchain. Fractional control of a domain name may include that a plurality of entities control modification abilities of the domain name. For example, such entities may provide respective authorizations and rejections of proposed changes to the domain name. Examples of such modification abilities may include the ability to modify the registrant of record for the domain name, the ability to select hosting of the domain name, the ability to implement DNSSEC for the domain name, and the ability to change a domain name system resource record for the domain name. According to some embodiments, each entity may have a specific fraction of control of a domain name. According to some embodiments, authorization by entities that collectively control all, or some proportion of less than all, of the total fractional control of a domain name is required to execute modification abilities of the domain name.

Embodiments according to this section provide many advantages over existing domain name control techniques. For example, some embodiments provide increased security for domain names. A controller of a domain name may wish to safeguard their domain name by requiring multiple entities to approve any changes to the domain name. Embodiments may provide such a safeguard mechanism by establishing fractional control of the domain name among a plurality of entities. According to various embodiments, one or more entities that collectively have fractional control of a majority, or any predefined proportion of the total fractional control of a domain name, may be required to provide authorization messages, e.g., to an executable program on a blockchain, in order to make changes to the domain name.

As another example, some embodiments provide geofencing support for domain names. For example, multiple entities may each have fractional control of the domain name. A particular such entity may be able to perform updates to the domain name only for a particular geographic region. For example, a first entity that has fractional control of the domain name may be able to perform updates to the domain name in a first geographic region, a second entity that has fractional control of the domain name may be able to perform updates to the domain name in a second geographic region, etc.

Embodiments include many innovations, benefits, and technical advantages. For example, some embodiments insert an executable program, described in detail herein, into the blockchain. Some embodiments provide novel services and status codes for domain names at a registry. Some embodiments provide novel interfaces to users. These and other features and advantages are described in detail herein.

FIG. 1 is a schematic diagram for a method 100 of preparing a blockchain and providing user accounts to a plurality of entities to establish fractional control of a domain name according to various embodiments. Method 100 may be performed to establish and configure the hardware, software, and protocol components used to perform the methods shown and described herein.

As shown, FIG. 1 depicts a blockchain 102, a registry 104, and a registrar 106. Registrar 106 is shown as an example registrar; in various embodiments, multiple such registrars 106 may interact with registry 104. FIG. 1 also depicts first entity 108 and second entity 110. First entity 108 and second entity 110 may be, or may become, users of blockchain 102. For example, first entity 108 and second entity 110 may have respective blockchain addresses and/or respective blockchain key pairs for blockchain 102. First entity 108 and second entity 110 are identified with their computers. First entity 108 and second entity 110 are depicted as non-limiting examples; embodiments may include any number of such entities.

Method 100 may include registry 104 providing 150 an executable program for storage on blockchain 102. Registry 104 may provide such an executable program directly to blockchain 102 or through an intermediary, for example. The executable program may be configured to execute while stored on blockchain 102 to perform the actions described herein. According to some embodiments, the executable program may be implemented as a smart contract. As described in detail below, the executable program stores and makes available to interested entities various information regarding fractional control of domain names. The executable program may store such information anywhere on the blockchain, e.g., as part of the executable program itself, or elsewhere on the blockchain.

The executable program may be configured to store, and provide to interested entities, such as first entity 108 and second entity 110, representations of one or more domain names that are available for fractional control. Such representations may be in the form of the domain names themselves. Further, the executable program may store and provide resources for acquiring fractional control of an available domain name, such as a number of tokens or an amount of cryptocurrency (described further below in reference to FIG. 2) to obtain a given fractional control of the domain name.

The executable program may be configured to store a representation of a domain name in association with one or more identifications of entities having fractional control of the domain name. The associations may be implemented in a table, for example, with a row in the table storing information associated with the domain name in respective columns, e.g., a column for the domain name, a column for an identification of a first entity, a column for an identification of a second entity, etc. The identifications may be in the form of blockchain addresses or blockchain public keys for the entities for blockchain 102.

According to some embodiments, other identifications may be used. For example, embodiments may store network identifiers, such as domain names, that the blockchain users use instead of their blockchain addresses for purposes of interacting with blockchain 102. Examples of such identifiers are disclosed in U.S. Published Application No. 2020/0328883, entitled "Domain Name Blockchain user Addresses", which is hereby incorporated by reference in its entirety. Each identification may further be stored in association with a representation of a fraction, e.g., a proportion, of its control of the domain name, e.g., in a column representing such fraction. For example, an identification of a first entity may be stored in association with a representation of 35%, and an identification of a second entity may be stored in association with a representation of 60%. According to this example, such representations indicate a total of 95% of the domain name. The percentages and representations as percentages are by way of non-limiting example; other representations of fractions or proportions are possible. Table 1 below depicts an example portion of a full table that the executable program may store and edit.

TABLE 1

| Domain Name | First Entity | Control by First Entity | Second Entity | Control by Second Entity |
| --- | --- | --- | --- | --- |
| example.com | 0 × abfc4 . . . | 35% | 0 × 14f98 . . . | 60% |

The executable program may store any of a variety of additional information in association with the domain name. For example, the executable program may store a representation of conditions required for modification of, or related to, the domain name. For example, such conditions may include that one or more entities that collectively have fractional control of a predefined proportion of a domain name may be required to provide authorization messages to the executable program in order to make changes to the domain name, as described further in detail below, e.g., in reference to FIG. 6.

Method 100 may include registry 104 implementing one or more additional features. According to some embodiments, registry 104 implements a status for domain names that it administers that are under fractional control. Such a status may be referred to as a fractional control lock. Registry 104 may store a representation of such status in association with a domain name so designated, e.g., in a table stored by registry 104. According to some embodiments, registry 104 may not modify a domain name (e.g., change the domain name's related data structures) under such a status unless certain requirements are met, e.g., where a representation of such requirements is stored by the executable program in association with the domain name, or stored by registry 104 in association with the domain name. A detailed description of these additional features is presented further below in reference to FIGS. 4 and 6.

Further according to method 100, an entity, such as first entity 108 and second entity 110, may acquire, or acquire access to, an interface through which it may communicate with blockchain 102 as described herein. The interface may be implemented as standalone software, a website, a browser extension, or any other form of software that can interact with blockchain 102. The interface may be provided as a webpage, or other user-accessible feature, by registry 104 or a registrar. First entity 108 and second entity 110 may already have blockchain addresses and/or blockchain key pairs, or may acquire them prior to, or as part of, the interface acquisition process. According to some embodiments, the interface utilizes a blockchain address or public key of the blockchain key pair of an entity as the identity of the entity for purposes of communication with blockchain 102.

According to some embodiments, the interface is implemented as an electronic wallet. For example, an electronic wallet may be a computer executable software program or application that facilitates interactions with a blockchain such as blockchain 102. The wallet may execute on a computing device such as a personal computer or a smart phone. The wallet may be used with a blockchain such as blockchain 102 to facilitate the sending and receiving of cryptocurrency. According to an embodiment, a wallet may have built in user-callable functionality to generate blockchain key pairs (or private keys and addresses) and send and receive cryptocurrency. According to an embodiment, the wallet, as contemplated herein, may have additional functionality for performing communications between blockchain 102 and entities such as first entity 108 and second entity 110 as described further herein.

Two possible non-limiting embodiments of method 100 for interface provision are presented in reference to FIG. 1. A first embodiment that utilizes registrar 106 is described presently in reference to first entity 108. The first embodiment may begin with first entity 108 accessing a user interface to registrar 106 to request 160 an interface to blockchain 102. The user interface may present an option, which first entity 108 may select, to obtain an interface to blockchain 102, e.g., for purposes of obtaining fractional control of a domain name. First entity 108 may create a blockchain key pair as part of the process, or may provide an existing blockchain address or public key of a blockchain key pair that first entity 108 possesses. Registrar 106 may further obtain various administrative, contact, and other information from first entity 108. Such information may include any, or any combination, of a physical address, an email address, a phone number, a fax number, a bank account number, or any other information required or requested by registrar 106. Registrar 106 may assess the provided information according to various criteria, e.g., by ensuring that first entity 108 has access to the provided email account. If registrar 106 approves the provision of the interface to first entity 108, it may proceed to request 162 that registry 104 provide such an interface to first entity 108. Registrar 106 may send the request 162 using, for example, Extensible Provisional Protocol (EPP) or Representational State Transfer (REST). Registrar 106 may include in the request 162 an identification of first entity 108 in the form of the blockchain address and/or public key of the blockchain key pair of first entity 108. Registrar 106 may further include any, or any combination, of information in the request 162 that first entity 108 provided to registrar 106 in the request 160. Registry 104 may store any of the information provided by registrar 106. For example, registry 104 may store a contact object for the first entity, such as the physical address, the email address, the phone number, and/or the fax number. Registry 104 may then send a request to the executable program on blockchain 102 to establish an interface to the executable program for first entity 108. The executable program may store the identification of first entity 108 in association with any other provided information. First entity 108 may then be provided with, or access to, an interface to the executable program on blockchain 102. For example, registry 104 or registrar 106 may pass an interface in the form of a standalone software or a browser extension to first entity 108, or may provide access to an interface in the form of a website, to first entity 108.

According to the first embodiment of method 100 for providing an entity with an interface to the executable program on blockchain 102 that utilizes EPP, a registrar that has access to registry 104 may participate in embodiments of fractional control of a domain name. However, if a particular registrar does not have access to registry 104 and/or does not participate in (e.g., opts out of) certain capabilities (e.g., fractional control) of registry 104, then a registrant that uses such a registrar may not be able to participate in fractional control of a domain name using that registrant.

In such instances, by way of non-limiting example, the registrant may change registrars to employ a registrar, such as registrar 106, that participates in fractional control capabilities. In some other such instances, by way of non-limiting example, a second embodiment of method 100 for interface provision, which utilizes direct communication with registry 104, may be used. Such a second embodiment, shown in FIG. 1 in reference to second entity 110, may proceed as described above in reference to the first embodiment, except instead of communicating with registry 104 through registrar 106, second entity 110 communicates directly with registry 104, e.g., using a user interface provided by registry 104. The communications may otherwise be identical to those described above in reference to the first embodiment. For example, second entity 110 may request 170 an interface to blockchain 102, passing information as described in reference to the first embodiment above, and registry 104 may send a corresponding request to the executable program on blockchain 102 to establish an interface to the executable program for second entity 110. The executable program may store the identification of second entity 110 in association with any other provided information, and second entity 110 may then be provided with, or access to, an interface to the executable program on blockchain 102 as described above in reference to the first embodiment.

Although the non-limiting example of FIG. 1 depicts the registry 104 and the registrar 106 as separate entities with separate functionality, in some other embodiments, a registrar 106 could be implemented with various registry-like functionality, such as providing a fractional control offering to registrant, deploying a smart contract on the blockchain 102, and the like. In yet other embodiments, the functionality of the registrar 104 may be vertically integrated into a registry, which registry can then also act as a registrar. In such embodiments, a registrant (e.g., entity 108) ma interact directly with the registry. Other variations are possible.

An entity, such as first entity 108 and second entity 110, that is provisioned with an interface may participate in embodiments that provide fractional control of a domain name. Entities that lack such an interface may be able to read fractional control information stored by the executable program on the blockchain, e.g., if the blockchain is public, but may not be able to obtain fractional control of a domain name themselves.

Figure 2:
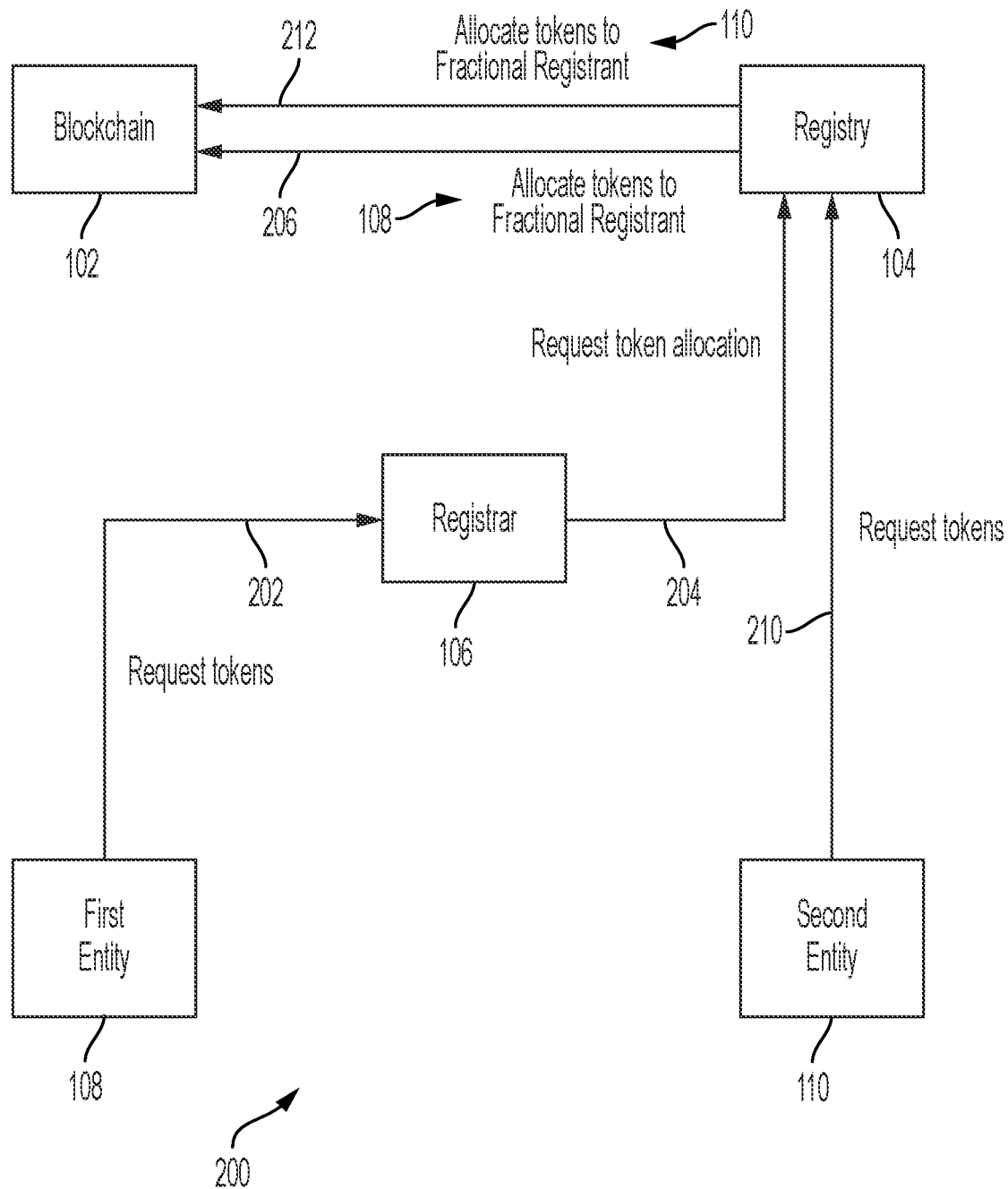
FIG. 2 is a schematic diagram for a method of allocating tokens to an entity to establish fractional control of a domain name according to various embodiments.

FIG. 2 is a schematic diagram for a method 200 of allocating a token(s) to an entity to establish fractional control of a domain name according to various embodiments. According to some embodiments, an entity such as first entity 108 or second entity 110 may acquire fractional control of a domain name in exchange for a token(s) or cryptocurrency. For example, a domain name may be listed on blockchain 102 as available for fractional control in 10,000 increments, with each increment available for $1. According to this example, an entity that wishes to control 10% of the domain name may provide $1000 in tokens or cryptocurrency, as described below in reference to FIG. 4. Two example embodiments of method 200 by which such an entity may be allocated tokens are described presently in reference to FIG. 2.

A first embodiment of method 200 that utilizes registrar 106 to allocate tokens to an entity is described presently in reference to first entity 108. The first embodiment may begin with first entity 108 accessing a user interface to registrar 106 to request 202 tokens. The user interface may accept an identification of first entity 108, e.g., in the form of a blockchain address and/or public key of a blockchain key pair, and a number of tokens (e.g., in terms of number of tokens or monetary payment) to be allocated. The user interface may accept payment for the tokens in the form of a credit card, wire transfer, or cryptocurrency, for example. If registrar 106 approves the token allocation to first entity 108, it may proceed to request 204 that registry 104 allocate tokens to first entity 108. Registrar 106 may send the request 204 using, for example, EPP or REST. Registrar 106 may include in the request 204 an identification of first entity 108 in the form of the blockchain address and/or public key of the blockchain key pair of first entity 108. Registry 160 may then send a request 206 to the executable program on blockchain 102 to allocate tokens to first entity 108. The executable program may store a representation of the allocated tokens in association with an identification of first entity 108, e.g., as part of the executable program or elsewhere in the blockchain.

A second embodiment of method 200 for token allocation, which utilizes direct communication with registry 104, is described presently. Such a second embodiment, shown in FIG. 2 in reference to second entity 110, may proceed as described above in reference to the first embodiment, except instead of communicating with registry 104 through registrar 106, second entity 110 communicates directly with registry 104, e.g., using a user interface provided by registry 104. The communications may otherwise be identical to those described above in reference to the first embodiment. Thus, second entity 110 requests 210 tokens, providing the same information as in the request 202 of the first embodiment, and registry 104 proceeds to request 212 that the executable program on blockchain 102 allocate tokens to second entity 110. The executable program may store a representation of the allocated tokens in association with an identification of second entity 110, e.g., as part of the executable program or elsewhere in the blockchain.

According to some embodiments, registry 104 may have an escrowed location to store the funds provided by entities for token allocation until the tokens are exchanged for fractional control of a domain name. This may permit, for example, an entity to convert its tokens back to currency and have registry 104 transfer the funds to the entity's bank account.

According to some embodiments, an interface accessible to entities as described above in reference to FIG. 1 may be used by such entities to view its token allocation and exchange tokens for fractional control of a domain name as described below in reference to FIG. 4.

According to some embodiments, registry 104 may provide a blockchain transaction relay service, e.g., if blockchain 102 is a public blockchain. Such a relay service may receive valid transaction requests that may be cryptographically signed by an entity's electronic wallet and submit them to blockchain 102. The relay may pay for a transaction, e.g., using its own cryptocurrency for blockchain 102.

Figure 3:
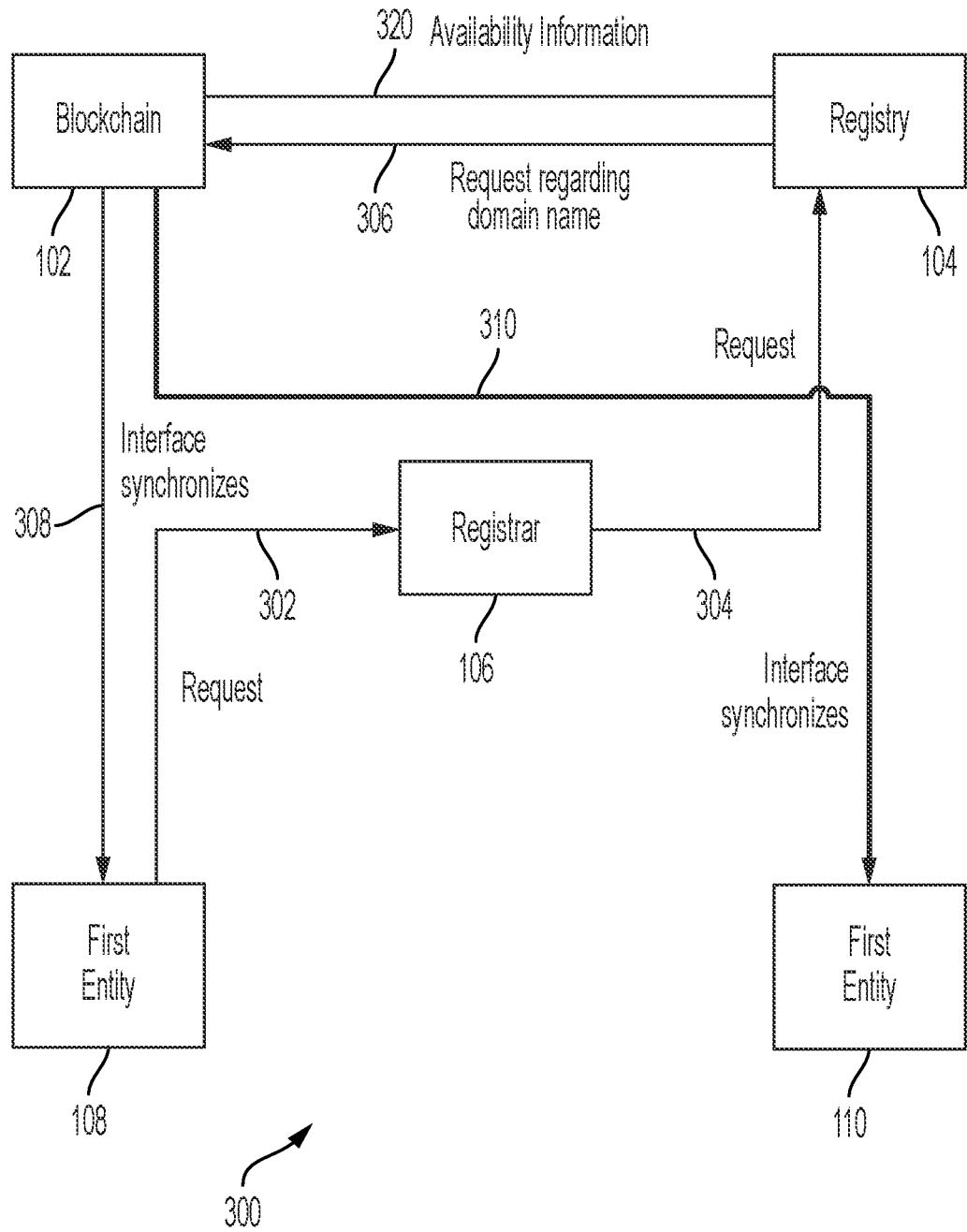
FIG. 3 is a schematic diagram for a method of listing domain names as available for fractional control according to various embodiments.

FIG. 3 is a schematic diagram for a method 300 of listing domain names as available for fractional control according to various embodiments. Two embodiments of method 300 are described in reference to FIG. 3. According to a first embodiment of method 300, registry 104 lists domain names available for fractional control on blockchain 102, e.g., according to a policy stored at registry 104. For example, a policy of registry 104 may include listing any or all domain names that are above a predetermined price point. To list a domain name as available for fractional control, registry 104 may obtain availability information, for example, by sending a request for availability information 320 to the executable program on blockchain 102 that specifies the domain name. The executable program may store a representation of the domain name in blockchain 102, e.g., as part of the executable program or elsewhere in blockchain 102. Subsequently, the interfaces of first entity 108 and second entity 110 synchronize 308, 310 with blockchain 102 by, for example, retrieving data from a location in blockchain 102 where domain names that are available for fractional control are stored. First entity 108 and second entity 110 may then utilize their respective interfaces to view domain names available for fractional control.

According to a second embodiment of method 300, a domain name may be listed on blockchain 102 as being available for fractional control in response to a request about the domain name, e.g., sent by first entity 108 to registrar 106. For example, first entity 108 may send a request 302 to registrar 106, e.g., through a user interface provided by registrar 106, regarding a domain name. According to various embodiments, the request may be in the form of a request to gain fractional control of the domain name, may be a general request regarding the availability of the domain name for registration, may be a specific request to make the domain name available for fractional control, or may be another request related to being listed as available for fractional control. According to some embodiments, the request may be signed using the private key of the blockchain key pair of first entity 108. Registrar 106 may convey a corresponding request 304 to registry 104. Registry 104 may then convey or communicate a corresponding request 306 to the executable program on blockchain 102, specifying the domain name. As in the first embodiment of method 300, the executable program may store a representation of the domain name in blockchain 102 as being available for fractional control. Further as in the first embodiment of method 300, the interfaces of first entity 108 and second entity 110 synchronize 308, 310 with blockchain 102, and first entity 108 and second entity 110 may utilize their interfaces to view the domain name as available for fractional control.

Figure 4:
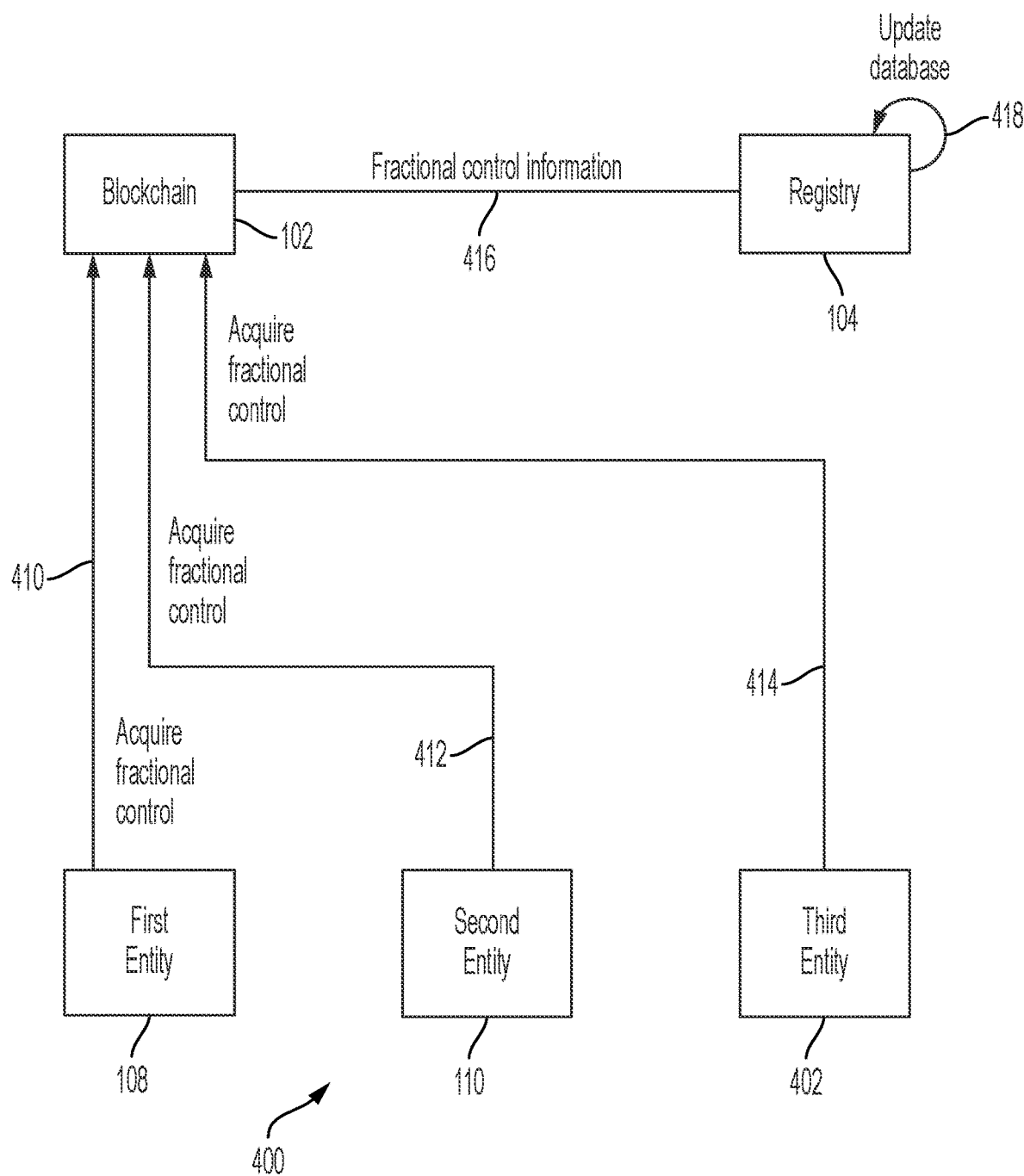
FIG. 4 is a schematic diagram for a method of acquiring fractional control of a domain name by each of a plurality of entities according to various embodiments.

FIG. 4 is a schematic diagram for a method 400 of acquiring fractional control of a domain name by each of a plurality of entities according to various embodiments. In general, after a domain name is available for fractional control, an entity that wishes to obtain fractional control of the domain name may do so using an interface, e.g., as provided as described above in reference to FIG. 1. According to various embodiments, the interface may communicate directly to blockchain 102. According to some embodiments, the interface may communicate with blockchain 102 by way of any of a relay, registrar 106, or registry 104. The executable program on blockchain 102 may then convert the entity's tokens into a fractional control of the domain name in its records (e.g., the records of the executable program may be altered to represent that the entity has fewer allocated tokens, and also to represent a fractional control of the domain name). The entity's interface may synchronize with the executable program on blockchain 102 and display a corresponding altered token allocation and a representation of the fractional control.

By way of non-limiting example, method 400 is described in reference to an example domain name, example.com, that is available for fractional control in increments. As shown in FIG. 4, first entity 108 may use an interface to acquire 410, for example, 40% fractional control of example.com, that is, 4000 of the available increments. Second entity 110 may use an interface to acquire 412, for example, 3500 increments of fractional control of example.com. And third entity 402 may use an interface to acquire 414, for example, 2500 increments of fractional control of example.com. Each respective interface may send a request signed by a respective private key of a blockchain key pair to blockchain 102. In each case, the executable program on blockchain 102 alters its records for example.com to include the respective fractional control amounts of each of first entity 108, second entity 110, and third entity 402. Further, the executable program reduces the respective allocations of tokens for each of first entity 108, second entity 110, and third entity 402. For example, each increment may require one token. For this example, the token allocation of first entity 108 is reduced by 4000 tokens, the token allocation of second entity 110 is reduced by 3500 tokens, and the token allocation of third entity 402 is reduced by 2500 tokens.

The executable program on blockchain 102 may communicate or make available 416 the acquisitions 410, 412, 414 of fractional control of example.com to registry 104 at various times according to various embodiments. According to some embodiments, the executable program makes available 416 each acquisition 410, 412, 414 after it happens, e.g., immediately after it happens. According to some embodiments, the executable program makes available fractional control information 416 about acquisition(s) of example.com to registry 104 only after a predetermined proportion of the fractional control is acquired by one or more entities. For example, for acquisitions ordered in time as 410, 412, and 414, and for such a predetermined proportion of 75%, the executable program on blockchain 102 may makes available 416 the acquisition of 4000 increments by first entity 108 and the acquisition of 3500 increments by second entity 110. According to some embodiments, the executable program makes available information about fractional control acquisition(s) of example.com to registry 104 only after 100% of the fractional control of example.com is acquired by one or more entities.

In various embodiments, the executable program of blockchain 102 may make the fractional control information available by providing it to and/or allowing it to be obtained by the registry 104. For two non-limiting examples, the executable program of blockchain 102 and the registry 104 may employ a publish/subscribe protocol or a polling-based protocol to communicate the fractional control information 416.

According to some embodiments, registry 104 may update 418 its database by storing an indication in its records that a particular domain name is under fractional control of one or more entities. Such a status may be referred to as a fractional control lock. As described above in reference to FIG. 1, registry 104 may prevent a modification of, or related to, a domain name that is indicated in its records as being under a fractional control lock unless certain requirements are met. Examples of such requirements for modification are described in detail below in reference to FIG. 6.

According to various embodiments, before a domain name is indicated as being under a fractional control lock in the records of registry 104, it can be registered by any entity. When registered by an entity, any existing fractional control may be cancelled, for example, by re-allocating tokens exchanged for fractional control to the entity or entities that acquired fractional control in exchange for the tokens, and by removing representations of fractional control by such entities at blockchain 102.

According to various embodiments, registry 104 updates 418 its database by storing a status of a domain name as, for example, fractional control lock, when a predetermined portion of the fractional control increments for the domain name are acquired by one or more entities. Such a predetermined portion may be any amount between 1% and 100%, inclusive. Continuing the ongoing example, if the predetermined portion is 75%, then registry 104 may change the status of example.com to fractional control lock after the executable program 102 makes available fractional control information 416 indicating that first entity 108 has acquired 4000 increments and second entity 110 has acquired 3500 increments of the full fractional control increments of example.com. According to some embodiments, any entity that has fractional control of a domain name may exchange its fractional control increments for the corresponding amount or number of tokens at any time prior to registry 104 designating the status of the domain name as being under fractional control lock.

According to some embodiments, registry 104 provides a landing webpage for a domain name under fractional control lock that indicates the domain name is under fractional control lock.

According to various embodiments, registry 104 may provide fractional control information for a domain name that is under fractional control (e.g., designated as being under fractional control lock) in response to a query by any entity. Such a query may be in the form of a query according to Registration Data Directory Service (RDDS), Registration Data Access Protocol (RDAP), Whois, or any other query protocol suitable for queries to registry 104. For example, in response to a query as to the status of a domain name that is under fractional control of one or more entities, registry 104 may return some or all of the associated information, e.g., any, or any combination of: identifications of the entities that have fractional control of the domain name, their respective proportions of fractional control, their contact information (e.g., a contact object), and/or a representation of conditions required for modification(s) of, or related to, the domain name. Alternately, or in addition, such a query may return an indication of a registrant for a domain name that is under fractional control. Such an indication may represent the registrant of the domain name as any of, for example: registry 104 (e.g., using IANA code ID=9999 or 9998), a code reserved for fractional control indications, or one or more of the entities that have fractional control of the domain name.

Figure 5:
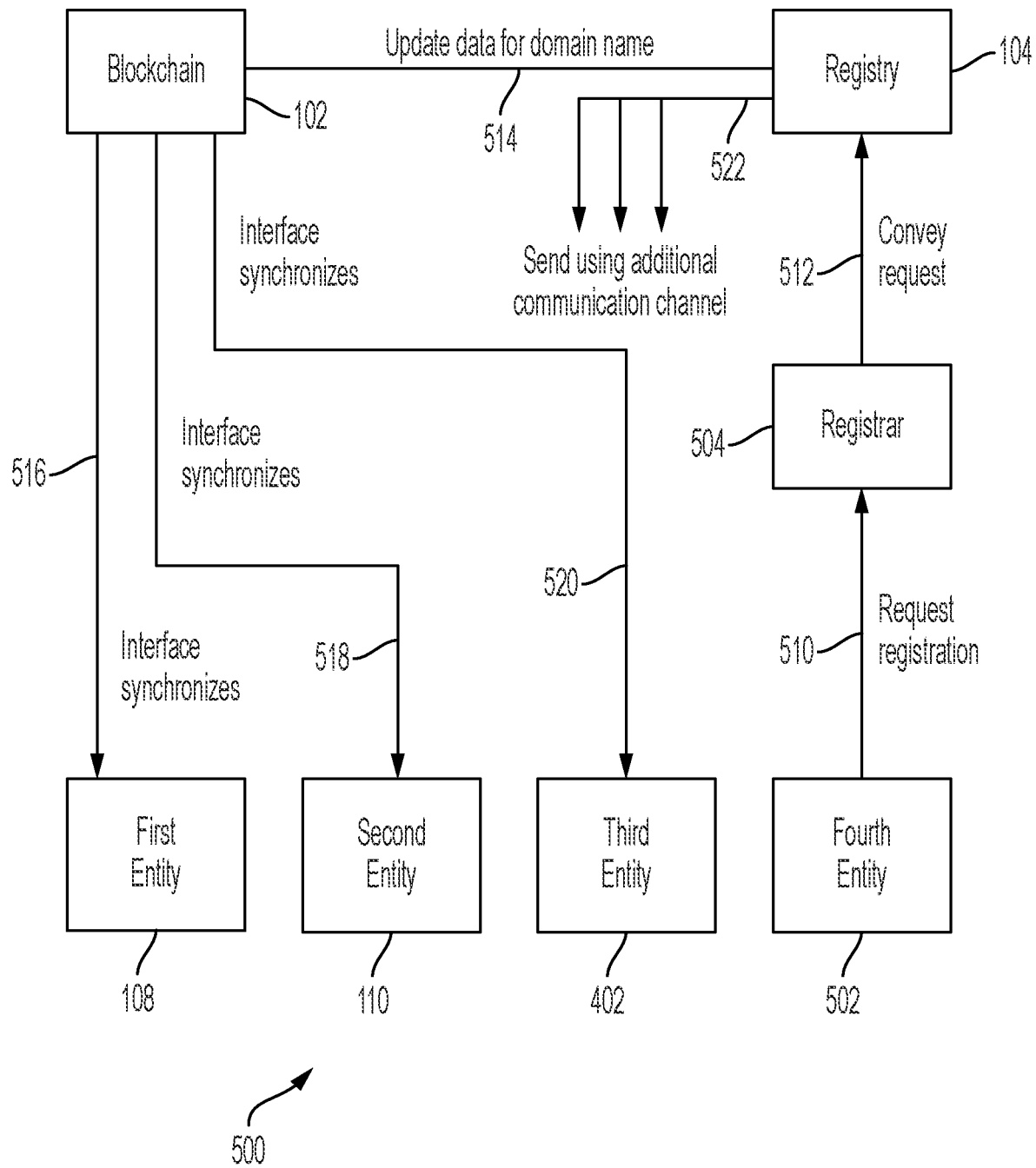
FIG. 5 is a schematic diagram for a method of requesting registration of a domain name that is under fractional control according to various embodiments.

FIG. 5 is a schematic diagram for a method 500 of requesting registration of a domain name that is under fractional control according to various embodiments. For convenience of exposition rather than limitation, method 500 is described in reference to the ongoing example presented above in reference to method 400 of FIG. 4, in which first entity 108 has acquired 4000 increments, second entity 110 has acquired 3500 increments, and third entity has acquired 2500 increments of the full 10,000 fractional control increments for example.com.

Method 500 may begin with fourth entity 502 requesting 510 registration of the domain name example.com from registrar 504. Registrar 504 may be the same as registrar 1106 or may be a different registrar. Fourth entity 502 may utilize an interface, e.g., on a webpage provided by registrar 504, to make the request. Registrar 504 may then convey 512 a representation of the request to registry 104. Registrar 504 may convey the representation of the request to registry 104 using, for example, EPP or REST.

Next, registry 104 updates 514 data for the domain name, in the ongoing example, example.com, in blockchain 102. For example, registry 104 may send, convey, or make available one or more messages or representations to the executable program on blockchain 514 indicating that fourth entity 502 has requested registration of example.com. The executable program may proceed to update its records for example.com to store an indication of the request for registration by fourth entity 502.

Next, the entities that have fractional control of example.com are alerted as to the request for registration of example.com by fourth entity 502. The executable program may send alerts to the interface(s) of entities that have fractional control of example.com, in this example, first entity 108, second entity 110, and third entity 402. Alternately, or in addition, the interfaces of first entity 108, second entity 110, and third entity 402 may provide alerts by synchronizing 516, 518, 520 with blockchain 102 and retrieving the representation of the request for registration by fourth entity 502. According to some embodiments, alternately, or in addition, registry 104 alerts first entity 108, second entity 110, and third entity 402 by sending 522 a representation of the request for registration by fourth entity 502 to first entity 108, second entity 110, and third entity 402 using one or more additional communication channels, such as by way of non-limiting example, email and/or physical mail.

Subsequently, first entity 108, second entity 110, and third entity 402 may provide authorization for, or reject, the registration requested by fourth entity 502, such that the executable program can determine whether or not to authorize registration of the domain name. Examples of how authorization or rejection may be determined or provided are shown and described below in reference to FIG. 6.

Figure 6:
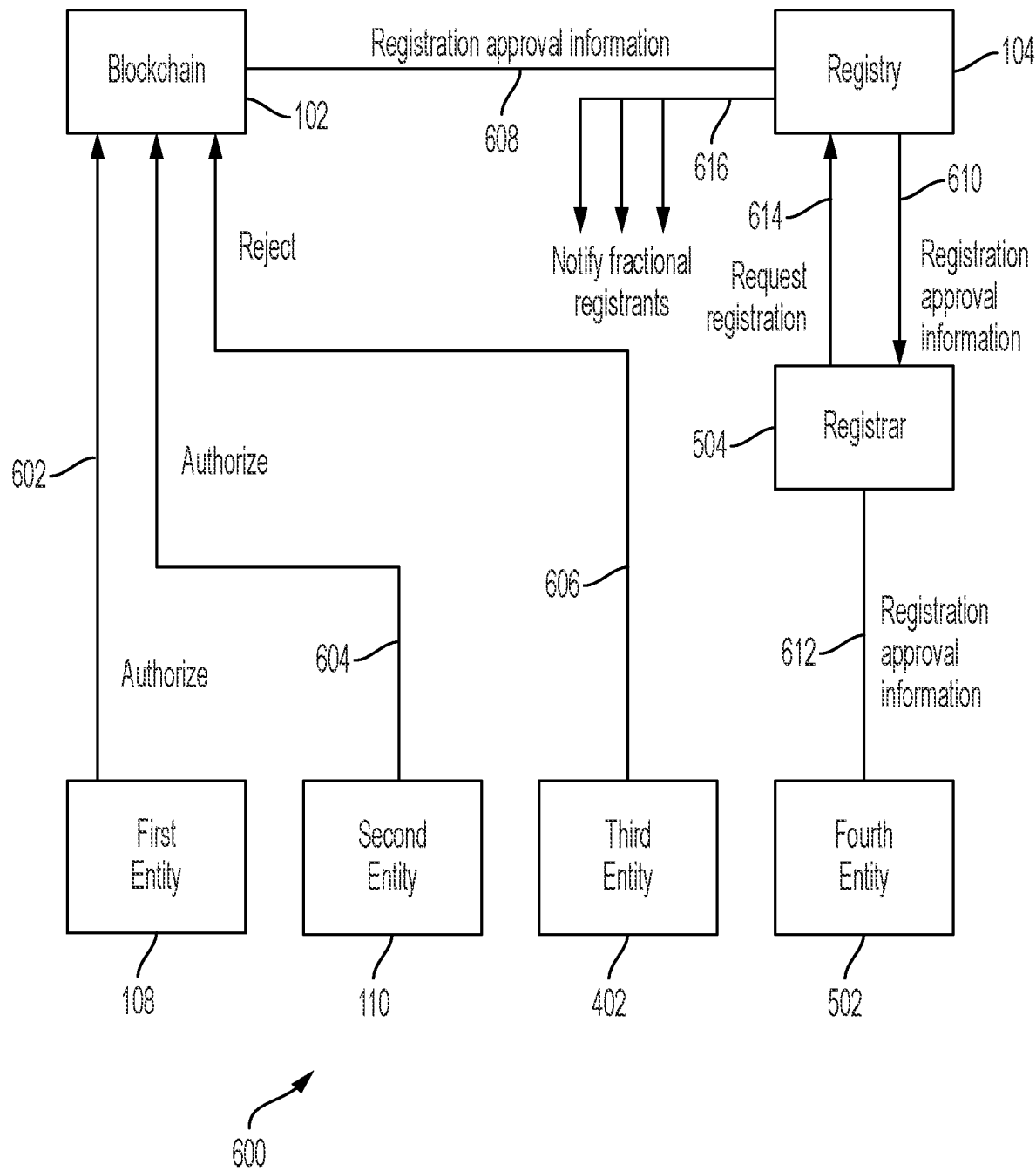
FIG. 6 is a schematic diagram for a method of making a change to, for example registering, a fractionally controlled domain name according to various embodiments.

FIG. 6 is a schematic diagram for a method 600 of making a change to, for example registering, a fractionally controlled domain name according to various embodiments. Method 600 is presented in reference to an example use case of registering the domain name example.com, continuing the ongoing example presented above in reference to method 400 of FIG. 4 and method 500 of FIG. 5.

By way of non-limiting example, method 600 is depicted according to first entity 108 authorizing 602, second entity 110 authorizing 604, and third entity 402 rejecting 606 the registration of example.com by fourth entity 502. As shown in FIG. 6, according to some embodiments, first entity 108, second entity 110, and third entity 402 provide authorization or rejection by communicating with the executable program on blockchain 602, e.g., using their interfaces as provided according to method 100 of FIG. 1. Such interfaces may display a representation of the requested registration, along with a button indicating "authorize" and a button indicating "reject". According to some embodiments, after first entity 108, second entity 110, and third entity 402 provide authorization or rejection, e.g., using such buttons, the respective interface sends a corresponding message to the executable program, which may store representations of authorizations and rejections in its records for example.com. According to some embodiments, entities 108, 110, and 402 may provide respective authorizations and rejections at a user interface (e.g., a webpage) provided by a registrar such as registrar 504, which may convey such authorizations or rejections to registry 104, e.g., using EPP or REST. Registry 104 may then convey the authorizations or rejections to the executable program on blockchain 102 and/or store indications of such authorizations and rejections in its records for example.com. According to some embodiments, entities 108, 110, and 402 may provide respective authorizations and rejections to registry 104 at a user interface provided by registry 104, which may send the authorizations or rejections to the executable program and/or store indications of such authorizations and rejections in the records of registry 104 for example.com.

After first entity 108, second entity 110, and third entity 402 provide their authorizations or rejections to blockchain 102 and/or registry 104, a determination is made as to whether to proceed with the requested registration. The determination may be based on the authorizations and rejections as compared to predetermined requirements for modification, e.g., where a representation of the requirements is stored by the executable program on blockchain 102 and/or registry 104. For purposes of illustration rather than limitation, method 600 is further described in reference to requirements for modification as stored by the executable program on blockchain 102.

The requirements for modification may include one or both of authorization requirements and timing requirements. For example, the requirements for modification may include receiving authorizations and/or rejections from one or more entities that collectively have fractional control of 100% of the increments for the domain name. The requirements for modification may include receiving authorizations and/or rejections from one or more entities that collectively have fractional control of some percentage other than 100%, e.g., at least 33%, 50%, 66%, or 75%, of the fractional control increments for the domain name. The requirements for modification may include receiving authorizations from one or more entities that collectively have fractional control of greater than 50% of the increments for the domain name. The requirements for modification may include receiving authorizations from one or more entities that collectively have fractional control of greater than some percentage other than 50%, e.g., greater than 33%, 66%, 75%, or a different percentage of the increments for the domain name. The requirements for modification may include receiving any required authorization(s) within a predetermined timeframe, e.g., relative to a time at which the request for registration was received by registrar 504, registry 104, or the executable program on blockchain 102. Such a timeframe may be a day, a week, a month, or any other time interval. The requirements for modification may include any combination of the example requirements described herein. Requirements for modification are not limited to the examples provided herein.

After the requirements for modification are met, the executable program on blockchain 102 may send or make available information indicating approval 608 for the registration of example.com to registry 104. In some embodiments, the information may be in the form of a message or the like in publication/subscribe communication protocol or a polling communication protocol. Registry 104 may then send 610 a notification of the registration approval to registrar 504, e.g., using EPP. Registrar 504 may then send 612 a notification of the registration to fourth entity 502, e.g., through a webpage user interface provided by registrar 504, by email, or by any other communication channel. Registrar 504 may then request 614 that registry 104 register the domain name, example.com, to fourth entity 502, e.g., using EPP. Registry 104 then registers the domain name to fourth entity 502. According to some embodiments, registry 104 may receive payment for the registration, e.g., in the form of a credit card, wire transfer, or cryptocurrency, convert the payment into tokens, and allocate the tokens to first entity 108, second entity 110, and third entity 402, e.g., in proportion to their fractional control increments.

According to some embodiments, registry 104 performs a rapid registration of the domain name to fourth entity 502. In general, registering a domain name may take on the order of several days to several weeks, due to various messages that must be sent between a registry and a registrar and the time limits for sending such messages. According to some embodiments, registration of the domain name by registry 104 may take less than an hour, for example. According to some embodiments, registration of the domain name may take less than ten minutes.

Method 600 is shown and described above in reference to registering a domain name; however, some or all of method 600 may be used to make other types of changes or modifications to a domain name that is under fractional control. For example, method 600 may be used to set a number of tokens and/or increments for fractional control of example.com. As another example, method 600 may be used to modify DNS information for example.com as stored at registry 104. Such DNS information may include modification of any DNS resource record for (e.g., related to) example.com. Example resource records include resource records of any of the following types: A (Host address), AAAA (IPv6 host address), ALIAS (Auto resolved alias), CNAME (Canonical name for an alias), MX (Mail eXchange), NS (Name Server), PTR (Pointer), SOA (Start Of Authority), SRV (location of service), TXT (Descriptive text), DNSKEY (DNSSEC public key), DS (Delegation Signer), NSEC (Next Secure), NSEC3 (Next Secure v.3), NSEC3PARAM (NSEC3 Parameters), and/or RRSIG (RRset Signature).

Figure 7:
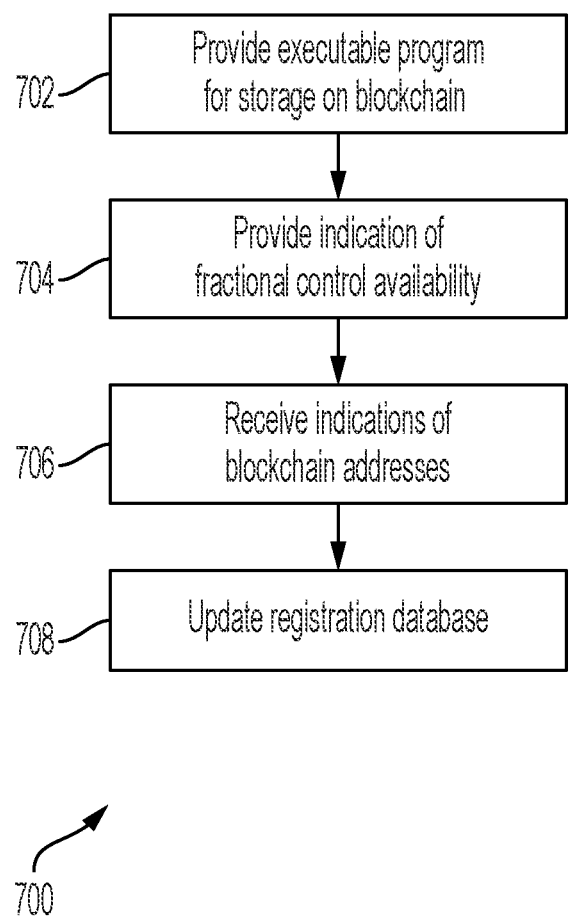
FIG. 7 is a flow diagram for a method of providing fractional control of a domain name to a plurality of entities according to various embodiments.

FIG. 7 is a flow diagram for a method 700 of providing fractional control of a domain name by a plurality of entities according to various embodiments. Method 700 may be performed by a registry, such as registry 104 as shown and described herein in reference to FIGS. 1-6.

At 702, an executable program is provided for storage on a blockchain. By way of non-limiting example, the actions of 702 may be as shown and described above in reference to the providing 150 of method 100 of FIG. 1.

At 704, an indication of fractional control availability is provided or made available. By way of non-limiting example, the actions of 704 may be as shown and described above in reference to the list availability 306 and/or 320 of method 300 of FIG. 3.

At 706, indications of a plurality of blockchain addresses are received, e.g., from an executable program stored on a blockchain, such as the executable program stored on blockchain 102 as described herein. By way of non-limiting example, the actions of 706 may be as shown and described above in reference to the operations for making fractional control information available 416 of method 400 of FIG. 4.

At 708, an indication of a fractional control status is stored in a registration database. By way of non-limiting example, the actions of 708 may be as shown and described above in reference to the updating 418 the database of method 400 of FIG. 4.

In general, embodiments according to Section I may include many variations and extensions. For example, a registrant of a domain name may make the domain name available for fractional control. According to this example, such a registrant may make a request to a registry or registrar to make the domain name available for fractional control. The registrant may specify any, or any combination of: one or more requirements for modification, a number of fractional control increments, and/or a number of tokens. The registry may place the domain name under a restricted status, such as a fractional control lock. The registrant may be provided with any number of fractional control increments for the domain name.

As another example, a registry may provide an interface, e.g., a user interface, an EPP, or a REST capability, for allowing a registrant of a domain name to provide a plurality of registrant-specified entities with fractional control of the domain name. According to some embodiments, this may be done without listing the domain name as available for fractional control, e.g., in a blockchain. For example, the registry may store fractional control information such as entity identifications of the specified entities and their fractional control portions on the blockchain, without providing the ability for other entities to acquire fractional control.

As another example, a registry, registrar, or interface as described herein in reference to method 100 of FIG. 1 may provide an entity with a notification feed of existing fractional ownership actions, such as domain names newly listed as being available for fractional control, acquisitions of fractional control by an entity, or registration of a domain name previously under fractional control.

According to some embodiments, a number of fractional control increments for a domain name may be dynamic. For example, a first number of fractional control increments may be associated with a domain name, and if that number of increments is acquired by one or more entities, additional increments may be acquired by one or more entities within some predetermined time interval, such as 24 hours or seven days.

As another example, renewal fees for a domain names under fractional control may be handled as follows. Prior to renewal time for the domain name, the registry or blockchain may notify each entity that has fractional control of the domain name that it needs to pay a share of the renewal fee. Failure of an entity to pay its share may cause their fractional control increments to be released without refunding tokens to such an entity.

As another example, embodiments may be used for domain names at any level, not limited to second level domain names. For example, embodiments may be used for top level domain names and subdomain names.

II. Partial Modification Ability of a Domain Name Registered to Another

Some embodiments according to Section II provide a partial modification ability of a domain name through the use of a blockchain. Partial modification ability of a domain name may include that less than all of the modification abilities for the domain name are provided to an entity that is not a registrant of the domain name. Examples of such partial modification abilities may include any, or any combination of: the ability to select hosting of the domain name, the ability to implement DNSSEC for the domain name, and the ability to change a domain name system resource record for the domain name. According to some embodiments, the partial modification ability excludes the ability to transfer the domain name, e.g., change the registrant of the domain name. According to some embodiments, a registrant of a domain name may provide to an entity that is not a registrant of the domain name partial modification ability for the domain name on a temporary basis, for example, for a predetermined time interval. At the end of the time interval, according to some embodiments, the entity that is not the registrant of the domain name may become the registrant of the domain name. At the end of the time interval, according to some embodiments, the entity that is not the registrant of the domain name may lose the partial modification ability, without becoming the registrant of the domain name.

Embodiments include many innovations, benefits, and technical advantages. For example, some embodiments insert an executable program, described in detail herein, into the blockchain. Some embodiments provide novel services and status codes for domain names at a registry. Some embodiments provide novel interfaces to users. These and other features and advantages are described in detail herein.

Embodiments according to Section II may include a setup phase similar to methods 100, 200, and 300, as shown and described in reference to FIGS. 1, 2, and 3, respectively, but with differences as described as follows.

Method 100 as shown and described herein in reference to FIG. 1 may be used as part of a setup phase of embodiments according to Section II, with the following differences. As in Section I, method 100 may be used to provide an executable program for storage on blockchain 102. The executable program may differ from the executable program of embodiments according to Section II, for example, in the information that it stores.

As described in detail below, the executable program stores and makes available to interested entities various information regarding partial modification ability of one or more domain names. The executable program may be configured to store, and provide to interested entities, representations of one or more domain names that are available for partial modification ability. Such representations may be in the form of the domain names themselves. Further, the executable program may store and provide resources for acquiring partial modification ability of an available domain name, such as a number of tokens or an amount of cryptocurrency.

The executable program may be configured to store a representation of a domain name in association with an identification of an entity having partial modification ability for the domain name and possibly an identification of a registrant of the domain name. In general, the entity having partial modification ability for the domain name will be different from the registrant of the domain name. The associations may be implemented in a table, for example, with a row in the table storing information associated with the domain name in respective columns, e.g., a column for the domain name, a column for an identification of a registrant of the domain name, and a column for an identification of an entity that has partial modification ability for the domain name. The identifications may be in the form of blockchain addresses or blockchain public keys of the entities for blockchain 102. According to some embodiments, other identifications may be used. For example, embodiments may store network identifiers, such as domain names, that the blockchain users use instead of their blockchain addresses for purposes of interacting with blockchain 102. Table 2 below depicts an example portion of a full table that the executable program may store and edit.

TABLE 2

| Domain Name | Registrant | Entity with Partial Modification Ability |
|---|---|---|
| example.com | 0 × fd2c4 . . . | 0 × 695d2 . . . |

The executable program may store any of a variety of additional information in association with the domain name. For example, the executable program may store a representation of time interval in which the identified entity has partial modification ability, e.g., by beginning date and time and duration (or end date and time). As another example, the executable program may store a representation of tokens required to be transferred to the registrant from the entity with partial modification ability at the beginning of the time interval, at the end of the time interval, and/or periodically throughout the time interval (and the length of such time periods). As another example, the executable program may store various DNS resource record information for the domain name, such as by way of non-limiting example, contents of one or more Name Server (NS) resource records for the domain name.

Further according to method 100 for embodiments according to Section II, the registrant and/or entity that has (or will obtain) partial modification ability, may acquire, or acquire access to, respective interfaces through which they may communicate with blockchain 102 as described herein. Such entities may include, as described below in reference to FIG. 8, a registrant such as registrant 802 and an entity, such as entity 810.

Method 100 for embodiments according to Section II may include registry 104 implementing one or more additional features. According to some embodiments, registry 104 implements a status for domain names that it administers that have an associated entity with partial modification ability. Registry 104 may store a representation of such status in association with a domain name so designated, e.g., in a table stored by registry 104. Registry 104 may store an identification of a registrant and an entity that has partial modification ability in association with the domain name so designated. An example of such a status may be referred to as a partial modification ability lock. According to some embodiments, registry 104 may not modify a domain name under such a status unless certain requirements are met, e.g., where a representation of such requirements is stored by the executable program in association with the domain name, or stored by registry 104 in association with the domain name. According to some embodiments, the registrant of a domain name that is under a partial modification ability lock may not alter the domain name (e.g., may not alter DNS resource records for the domain name) when it is under partial modification ability lock, or may not make such alterations unless authorized by an entity that has partial modification ability for the domain name. According to some embodiments, an entity that has partial modification ability for a domain name may modify a domain name that is under partial modification ability lock, e.g., modify any related domain name system resource record for the domain name, but may not change a registrant of the domain name.

Method 200 as shown and described herein in reference to FIG. 2 may be used as part of a setup phase for embodiments according to Section II, with the following differences. According to some embodiments, an entity may acquire partial modification ability of a domain name in exchange for tokens or cryptocurrency. Accordingly, method 200 may be used to allocate tokens to such an entity.

Method 300 as shown and described herein in reference to FIG. 3 may be used as part of a setup phase of embodiments according to Section II, with the following differences. Rather than (or in addition to) using method 300 to list domain names as available for fractional control, method 300 may be used to list domain names that are available for partial modification ability. For example, registry 104 may list domain names available for partial modification ability on blockchain 102, e.g., according to a policy stored at registry 104. As another example, a domain name may be listed on blockchain 102 as being available for partial modification ability in response to request about the domain name, e.g., sent by first entity 108 to registrar 106.

Figure 8:
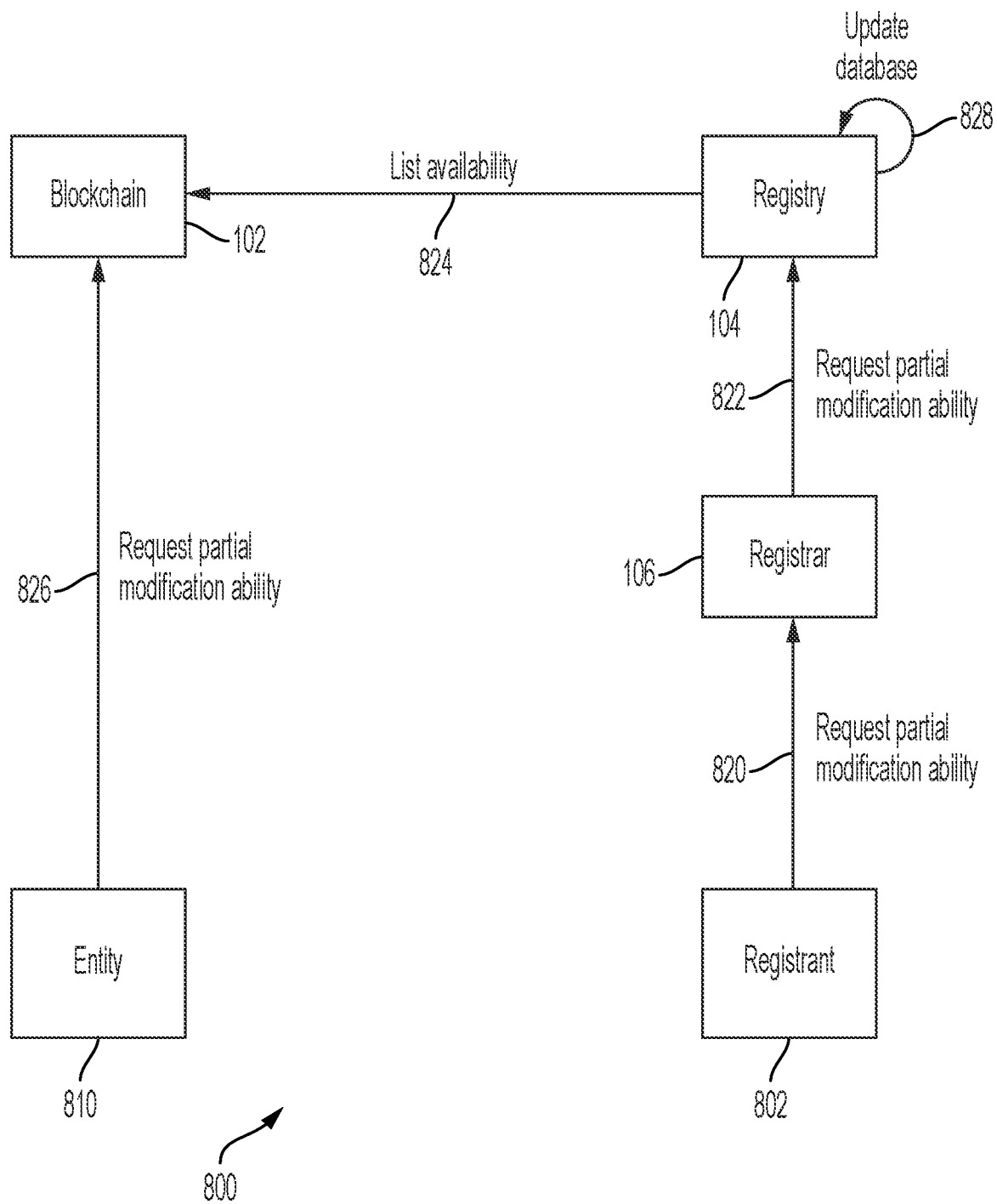
FIG. 8 is a schematic diagram for a method of providing partial modification ability of a domain name according to various embodiments.

FIG. 8 is a schematic diagram for a method 800 of providing partial modification ability of a domain name according to various embodiments. For convenience of exposition rather that limitation, method 800 is described in reference to blockchain 102, registry 104, and registrar 106, each of which may be as described above in Section I, but with differences as noted herein in Section II. Further, method 800 is described in reference to registrant 802. Registrant 802 is a registrant of a domain name, by way of non-limiting example, example.com. Method 800 is further described in reference to entity 810. Entity 810 may be as described above in reference to first entity 108. Entity 810 may wish to obtain partial modification ability of the domain name of registrant 802, example.com. Both registrant 802 and entity 810 are identified with their respective computers.

Method 800 may begin with registrant 802 requesting 820 that its domain name, example.com in this non-limiting example, be made available for partial modification ability. The request may include a representation of the domain name and an identification of registrant 802, e.g., a blockchain address and/or public key of a blockchain key pair. The request may include any of a variety of additional information. For example, the request may specify a term of validity (e.g., a length of time) for which partial modification ability of the domain name will be in force. The request may include specify a number of tokens or amount of cryptocurrency required for the partial modification ability, e.g., a total amount and/or an amount required periodically throughout the term. The request may specify the length of periods for providing tokens or cryptocurrency, e.g., weekly, monthly, quarterly, yearly, or any other time period. The request may specify whether a recipient of the partial modification ability will have an option to register the domain name at the end of the term of validity, and if so, may specify an amount or number of tokens or cryptocurrency required for registration.

According to some embodiments, the request may be made to registrar 106, e.g., using a user interface provided by registrar 106, such as a webpage. Registrar 106 receives the request, and sends a representation of the request to registry 104. According to some embodiments, registrant 802 requests that its domain name be made available for partial modification ability by making a request directly to registry 104, e.g., using EPP, REST, or a user interface provided by registry 104.

Next, registry 104 may update its records for example-.com to indicate that it is available for partial modification ability. Registry may store an indication of partial modification availability in association with the domain name, as well as the identification of registrant 802. Registry may store representations of any, or any combination, of the information provided in the request 820 by registrant 802.

Next, registry 104 lists 824 the domain name, example.com, as available for partial modification ability on blockchain 102. To do so, registry 104 may send a message to the executable program on blockchain 102. The message may include a representation of the domain name, as well as any, or any combination, of the information provided in the request 820 by registrant 802. Subsequently, an entity, such as entity 810, that has an interface to the executable program on blockchain 102 may view the domain name as being available for partial modification ability. For example, the interface of entity 810 may synchronize with blockchain 102 by, for example, retrieving data from a location in blockchain 102 where domain names that are available for partial modification ability are stored.

Next, entity 810 may request 826 partial modification ability of the domain name, e.g., that entity be provided with partial modification ability of the domain name for a length of time. Entity 810 may provide its request to the executable program on blockchain 102 using its interface to the executable program on blockchain 102. The request may include a representation of the domain name (e.g., the domain name itself) and an identification of entity 810, e.g., a blockchain address or public key of a blockchain key pair of entity 810. The request may be signed by a private key of a blockchain key pair of entity 810. According to some embodiments, entity 810 may communicate with blockchain 102 by way of any of its interface, a relay, registrar 106, or registry 104.

The executable program on blockchain 102 may then convert the tokens allocated to entity 810 into a partial modification ability of the domain name in its records (e.g., the records of the executable program may be altered to represent that entity 810 has fewer allocated tokens, and also to represent a partial modification ability of the domain name for entity 810). The interface of entity 810 may synchronize with the executable program on blockchain 102 and display a corresponding altered token allocation and a representation of the partial modification ability. The executable program on blockchain 102 may report the partial modification ability of example.com to registry 104.

According to some embodiments, registry 104 may update 828 its database by storing an indication in its records that example.com is under partial modification ability, e.g., a partial modification ability lock. Registry 104 may prevent modification by registrant 802 of example.com when it is under partial modification ability, unless authorization is provided by entity 810. Such authorization may be provided by entity 810 using the interface to the executable program on blockchain 102. Registry 104 may permit entity 810 to make some modifications to example.com when it is under partial modification ability. For a non-limiting example, entity 810 may make modifications to any, or any combination of DNS resource records that include: A (Host address), AAAA (IPv6 host address), NS (Name Server), and DS (Delegation Signer). In various other examples, the entity 810 may modify other types of resource records, such as: ALIAS (Auto resolved alias), CNAME (Canonical name for an alias), MX (Mail eXchange), PTR (Pointer), SOA (Start Of Authority), SRV (location of service), TXT (Descriptive text), DNSKEY (DNSSEC public key), NSEC (Next Secure), NSEC3 (Next Secure v.3), NSEC3PARAM (NSEC3 Parameters), and/or RRSIG (RRset Signature). According to some embodiments, entity 810 may be prevented from changing a registrant of the domain name, e.g., entity 810 may be prevented from transferring the domain name.

According to various embodiments, registry 104 may provide partial modification ability information for a domain name that is under partial modification ability in response to a query by any entity. Such a query may be in the form of a query according to Registration Data Directory Service (RDDS), Registration Data Access Protocol (RDAP), Whois, or any other query protocol suitable for queries to registry 104. For example, in response to a query as to the status of a domain name that is under partial modification ability, registry 104 may return some or all of the associated partial modification ability information, e.g., any, or any combination of: an identification of an entity (e.g., entity 810) that has partial modification ability for the domain name, the contact information of such an entity (e.g., a contact object), a representation of the term of the partial modification ability, and/or a representation of a number of tokens, cryptocurrency amounts, and periods associated with the partial modification ability. Alternately, or in addition, such a query may return an indication of a registrant for a domain name that is under partial modification ability.

Figure 9:
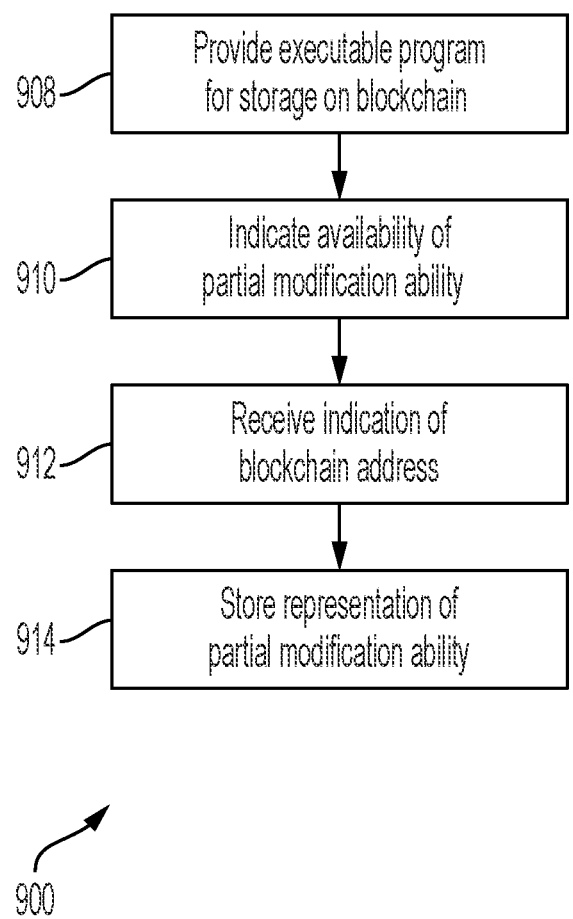
FIG. 9 is a flow diagram for a method of providing partial modification ability of a domain name registered to another according to various embodiments.

FIG. 9 is a flow diagram for a method 900 of providing partial modification ability of a domain name according to various embodiments. Method 900 may be performed by a registry, such as registry 104 as shown and described herein in reference to FIGS. 1-6 and 8.

At 908, an executable program is provided for storage on a blockchain. By way of non-limiting example, the actions of 908 may be as shown and described above in reference to the providing 150 of method 100 of FIG. 1, with differences as described in Section II.

At 910, an indication of availability of partial modification ability is provided. By way of non-limiting example, the actions of 910 may be as shown and described above in reference to the listing availability 824 of method 800 of FIG. 8.

At 912, an indication of a blockchain address is received, e.g., from an executable program stored on a blockchain, such as the executable program stored on blockchain 102 as described herein in Section II. By way of non-limiting example, the actions of 912 may be as shown and described above in reference to the requesting partial modification ability 826 of method 800 of FIG. 8.

At 914, an indication of a partial modification ability status is stored in a registration database. By way of non-limiting example, the actions of 914 may be as shown and described above in reference to the updating 828 the database of method 800 of FIG. 8.

In general, embodiments according to Section II may include many variations and extensions. For example, embodiments may be used for domain names at any level, not limited to second level domain names. For example, embodiments may be used for top level domain names and subdomain names.

In general, methods, elements, techniques, messages, and features that are disclosed in Section I may be combined with or used in combination with methods, elements, techniques, messages, and features that are disclosed in Section II. Combinations of embodiments according to Section I and embodiments according to Section II are contemplated.

III. Example System

Section III shows and describes various hardware and other resources that may be used to implement embodiments as shown and described herein in Section I and Section II.

Figure 10:
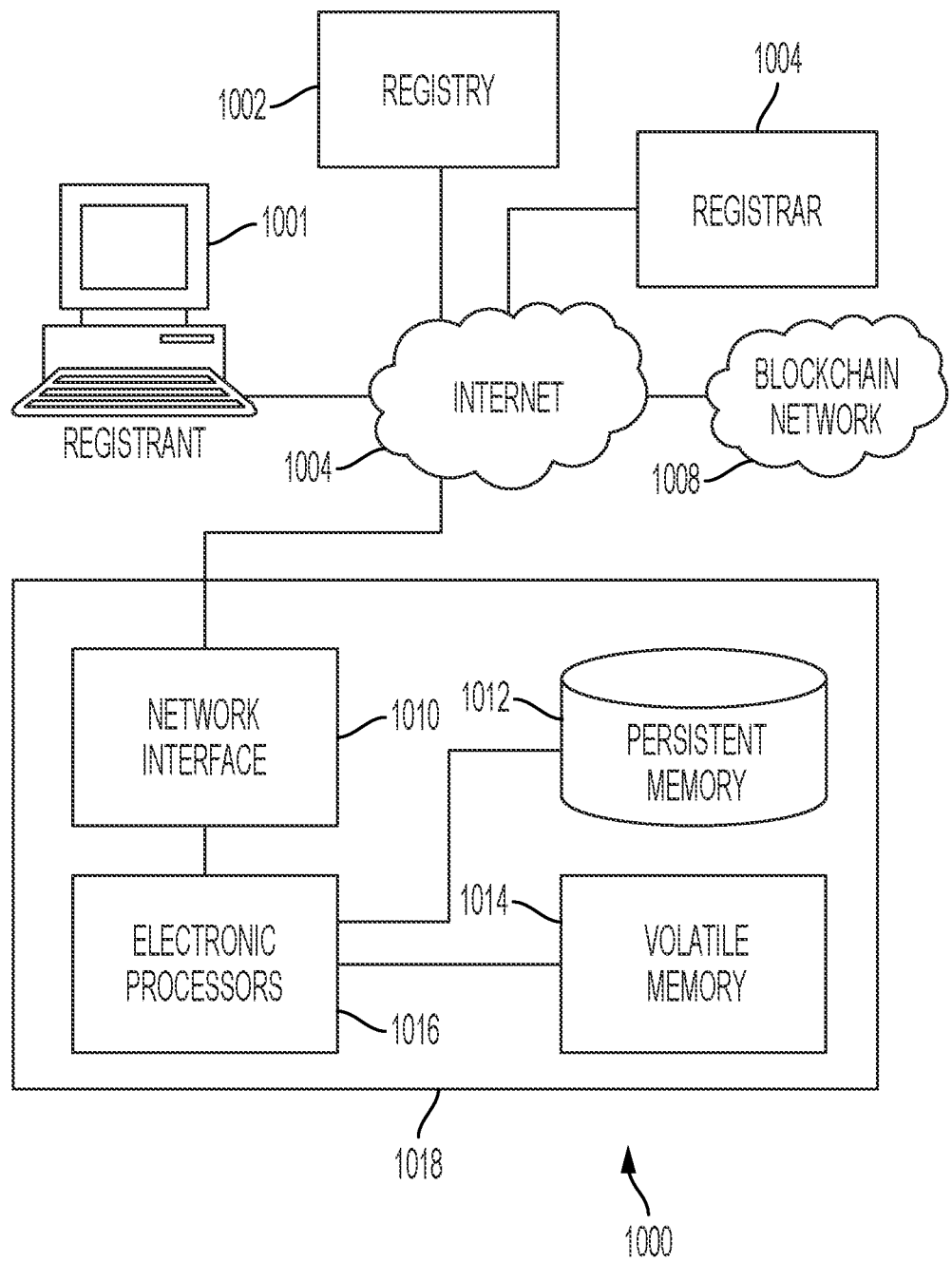
FIG. 10 is a schematic diagram of a hardware computer system according to various embodiments.

FIG. 10 is a schematic diagram of a hardware computer system 1000 including server computer 1018 according to various embodiments. System 1000 includes, for example, registrant 202 (identified with their computer), DNS registry 1002, DNS registrar 1004, and server computer 1018, all communicatively coupled to the internet 1004. System 1000 may also include blockchain 1008, which itself may include a plurality of networked nodes, which themselves may be networked through the internet 1004. Server computer 1018 may be, for example, a server computer of registry 102, registrar 104, or trusted service provider 502, according to various embodiments. Registry 1002 may be registry 102, and/or registrar 1004 may be registrar 104, consistent with server computer 1018 being either registry 102 or registrar 104, according to various embodiments. FIG. 10 is intended to display the various components networked together, as well as the internal workings of a server computer consistent with the various, e.g., registry and registrar, servers disclosed herein.

Server computer 1018 may include network interface 1010 to communicatively couple to the internet 1004. Network interface 1010 may include a physical network interface, such as a network adapter. Server computer 1018 may be a special-purpose computer, adapted for reliability and high-bandwidth communications. Thus, server computer 1018 may be embodied in a cluster of individual hardware server computers, for example. Alternately, or in addition, server computer 1018 may include redundant power supplies. Persistent memory 1012 may be in a Redundant Array of Inexpensive Disk drives (RAID) configuration for added reliability, and volatile memory 1014 may be or include Error-Correcting Code (ECC) memory hardware devices. Server computer 1018 further includes one or more electronic processors 1016, which may be multi-core processors suitable for handling large amounts of information. Electronic processors 1016 are communicatively coupled to persistent memory 1012, and may execute instructions stored thereon to at least partially effectuate the techniques, functions, and operations disclosed herein, e.g., any of the methods shown and described herein in reference to FIGS. 1-9, and any variation, modification, or alternate methods as described herein. Electronic processors 1016 are also communicatively coupled to volatile memory 1014.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of providing fractional control of a domain name by a plurality of entities, the method comprising:
providing an executable program for storage on a blockchain, the executable program configured to store a representation of the domain name in association with a plurality of identifications, wherein each of the plurality of identifications correspond to an entity that has a fractional control of the domain name, wherein each fractional control of the domain name allows for providing one of an authorization or a refusal of a modification related to the domain name;
indicating, to the executable program, that the domain name is available for fractional control;
receiving a message from the executable program, the message comprising the representation of the domain name and indications of a plurality of blockchain addresses, where the indications of the plurality of blockchain addresses are stored by the executable program as the plurality of identifications; and
storing, in a domain name registration database, a representation of a fractional control status of the domain name.

2. The method of claim 1, wherein the fractional control status of the domain name comprises a fractional control locked status of the domain name.

3. The method of claim 1, further comprising:
receiving a request to update domain name system data for the domain name for a geographic region, wherein the request originates from at least one entity represented by the indications of the plurality of blockchain addresses;
determining that the at least one entity is authorized to update domain name system data for the domain name for the geographic region; and
updating the domain name system data for the domain name for the geographic region.

4. The method of claim 1, wherein the executable program is further configured to determine whether to update domain name system data for the domain name by sending queries to a plurality of entities represented by the indications of the plurality of blockchain addresses, the method further comprising:
receiving a request to update domain name system data for the domain name, wherein the request originates from an entity represented by one of the indications of the plurality of blockchain addresses;
conveying a representation of the request to the executable program;
receiving a response from the executable program; and
updating the domain name system data for the domain name based on the response.

5. The method of claim 1, further comprising, prior to the storing, receiving a message from a registrar for the domain name requesting the indicating.

6. The method of claim 1, further comprising:
receiving a request for a registration status for the domain name; and
providing, in response to the message, at least one of the indications of the plurality of blockchain addresses.

7. The method of claim 1, further comprising:
providing, to at least one entity represented by the indications of the plurality of blockchain addresses, an interface to the executable program.

8. The method of claim 7, wherein the interface is configured to retrieve, from the executable program, the domain name that is available for fractional control, wherein the interface is configured to display the domain name that is available for fractional control.

9. The method of claim 1, further comprising:
receiving, from a requesting entity, a request to register the domain name; and
conveying a representation of the request to the executable program.

10. The method of claim 9, wherein the executable program is further configured to determine whether to authorize registration of the domain name by the requesting entity based on a plurality of communications received from entities represented by the indications of the plurality of blockchain addresses.

11. A system for providing fractional control of a domain name by a plurality of entities, the system comprising:
a memory containing instructions; and
a processor, operably connected to the memory, that executes the instructions to perform operations comprising:
providing an executable program for storage on a blockchain, the executable program configured to store a representation of the domain name in association with a plurality of identifications, wherein each of the plurality of identifications correspond to an entity that has a fractional control of the domain name, wherein each fractional control of the domain name allows for providing one of an authorization or a refusal of a modification related to the domain name;
indicating, to the executable program, that the domain name is available for fractional control;
receiving a message from the executable program, the message comprising the representation of the domain name and indications of a plurality of blockchain addresses, where the indications of the plurality of blockchain addresses are stored by the executable program as the plurality of identifications; and
storing, in a domain name registration database, a representation of a fractional control status of the domain name.

12. The system of claim 11, wherein the fractional control status of the domain name comprises a fractional control locked status of the domain name.

13. The system of claim 11, wherein the operations further comprise:
receiving a request to update domain name system data for the domain name for a geographic region, wherein the request originates from at least one entity represented by the indications of the plurality of blockchain addresses;
determining that the at least one entity is authorized to update domain name system data for the domain name for the geographic region; and
updating the domain name system data for the domain name for the geographic region.

14. The system of claim 11, wherein the operations further comprise:
receiving a request for a registration status for the domain name; and
providing, in response to the message, at least one of the indications of the plurality of blockchain addresses.

15. The system of claim 11, wherein the operations further comprise:
providing, to at least one entity represented by the indications of the plurality of blockchain addresses, an interface to the executable program.

16. The system of claim 15, wherein the interface is configured to retrieve, from the executable program, the domain name that is available for fractional control, and
wherein the interface is configured to display the domain name that is available for fractional control.

17. The system of claim 11, wherein the operations further comprise:
receiving, from a requesting entity, a request to register the domain name; and
conveying a representation of the request to the executable program.

18. The system of claim 17, wherein the executable program is further configured to determine whether to authorize registration of the domain name by the requesting entity based on a plurality of communications received from entities represented by the indications of the plurality of blockchain addresses.

19. One or more non-transitory computer-readable media storing instructions executable by a processor, wherein the instructions, when executed, cause the processor to perform operations comprising:
providing an executable program for storage on a blockchain, the executable program configured to store a representation of a domain name in association with a plurality of identifications, wherein each of the plurality of identifications correspond to an entity that has a fractional control of the domain name, wherein each fractional control of the domain name allows for providing one of an authorization or a refusal of a modification related to the domain name;
indicating, to the executable program, that the domain name is available for fractional control;
receiving a message from the executable program, the message comprising the representation of the domain name and indications of a plurality of blockchain addresses, wherein the indications of the plurality of blockchain addresses are stored by the executable program as the plurality of identifications; and
storing, in a domain name registration database, a fractional control status of the domain name.

20. The one or more non-transitory computer-readable media of claim 19, wherein the fractional control status indicates the fractional control of one or more entities associated with the domain name.

* * * * *